US012676275B2

(12) United States Patent
Keren et al.

(10) Patent No.: US 12,676,275 B2
(45) Date of Patent: Jul. 7, 2026

(54) PYROTECHNIC FUSE

(71) Applicant: Solaredge Technologies Ltd., Herzeliya (IL)

(72) Inventors: Yuval Keren, Rehovot (IL); Aya Kittany, Baka el Garbiya (IL)

(73) Assignee: Solaredge Technologies Ltd., Herzeliya (IL)

( * ) Notice: Subject to any disclaimer, the term of this patent is extended or adjusted under 35 U.S.C. 154(b) by 261 days.

(21) Appl. No.: 18/411,807

(22) Filed: Jan. 12, 2024

(65) Prior Publication Data

US 2024/0242912 A1 Jul. 18, 2024

Related U.S. Application Data

(60) Provisional application No. 63/480,002, filed on Jan. 15, 2023.

(51) Int. Cl.
*H01H 39/00* (2006.01)
*H01H 50/36* (2006.01)
*H01H 89/00* (2006.01)

(52) U.S. Cl.
CPC .......... *H01H 89/00* (2013.01); *H01H 39/006* (2013.01); *H01H 50/36* (2013.01)

(58) Field of Classification Search
CPC ........... H01H 89/00; H01H 39/00-006; H01H 2039/008; H01H 50/36; H01H 36/00; H01H 36/0006
See application file for complete search history.

(56) References Cited

U.S. PATENT DOCUMENTS

| | | | | |
|---|---|---|---|---|
| 9,221,343 | B2 | 12/2015 | Tokarz et al. | |
| 9,733,279 | B2 | 8/2017 | Ausserlechner et al. | |
| 10,566,160 | B2 | 2/2020 | McTigue et al. | |
| 2006/0049027 | A1 * | 3/2006 | Iversen | H01H 39/006 200/61.8 |
| 2007/0242402 | A1 * | 10/2007 | Papallo | H02J 3/001 361/63 |

(Continued)

FOREIGN PATENT DOCUMENTS

| | | | |
|---|---|---|---|
| CN | 105684254 | A | 6/2016 |
| DE | 19739721 | C2 | 9/1999 |

(Continued)

OTHER PUBLICATIONS

Jul. 15, 2024—European Search Report—EP App. No. 24151915.6.

(Continued)

*Primary Examiner* — Jacob R Crum
(74) *Attorney, Agent, or Firm* — Banner & Witcoff, Ltd.

(57) ABSTRACT

Systems and methods described herein are directed to a pyrotechnic fuse comprising a magnetic concentrator configured to partially surround at least a portion of a busbar, wherein the magnetic concentrator may comprise an aperture, a pyrotechnic actuator (which may be coupled to the busbar and configured to stop electrical flow in the busbar when the pyrotechnic actuator is activated), and a magnetic switch (which may be located within or near the aperture). The magnetic switch may be configured to activate the pyrotechnic actuator when a current through the busbar reaches a threshold current. An angle of the magnetic switch relative to the aperture may determine the threshold current.

21 Claims, 14 Drawing Sheets

(56) References Cited

U.S. PATENT DOCUMENTS

| | | | | |
|---|---|---|---|---|
| 2014/0375304 | A1* | 12/2014 | Holce | G01R 31/343<br>324/127 |
| 2015/0285841 | A1* | 10/2015 | Doljack | G01R 15/207<br>324/127 |
| 2018/0013279 | A1 | 1/2018 | Siciak et al. | |
| 2019/0108957 | A1 | 4/2019 | Volkmann et al. | |
| 2019/0198277 | A1* | 6/2019 | Mctigue | H01H 71/08 |
| 2020/0243290 | A1* | 7/2020 | Sax | H02J 7/0031 |
| 2021/0066010 | A1 | 3/2021 | Konkol | |
| 2021/0142969 | A1 | 5/2021 | Bush et al. | |
| 2022/0148832 | A1* | 5/2022 | Kube | B60L 3/04 |
| 2022/0246377 | A1* | 8/2022 | Gerlaud | H01H 85/0241 |
| 2022/0278520 | A1* | 9/2022 | Boury | H01H 47/002 |

FOREIGN PATENT DOCUMENTS

| | | | |
|---|---|---|---|
| GB | 2577984 | A | 4/2020 |
| GB | 2599740 | A | 4/2022 |
| KR | 101711435 | B1 | 3/2017 |

OTHER PUBLICATIONS

R. Ouaida et al., "Hybrid Protection based on Pyroswitch and Fuse Technologies for DC Applications," HAL Open Science, Symposium de Genie Electrique, Jun. 2016.

* cited by examiner

PYROTECHNIC FUSE

CROSS-REFERENCE TO RELATED APPLICATIONS

This application claims the benefit of U.S. Provisional Application No. 63/480,002, filed on Jan. 15, 2023. The above-referenced application is hereby incorporated by reference in its entirety.

BACKGROUND

In high current circuits, the isolation and safety of the circuit is an important consideration. Safety measures for products containing high current circuits may include preventing exposure to potentially hazardous voltage levels. Thus, there is a need for some type of isolation between circuits. Two commonly used solutions for isolating circuits are circuit breakers and fuses. A circuit breaker may be in the form of a switch. A fuse may mechanically break the circuit, thereby needing to be replaced once used. Fuses are commonly used as a safety device, to provide a safe and cost effective way to disconnect a circuit during electrical overloads, which could damage components or wiring and potentially cause a fire.

SUMMARY

The following presents a simplified summary of various concepts disclosed herein. This summary is not an extensive overview and is not intended to identify key or critical elements or to delineate the scope of the claims. This summary is not intended to limit or constrain the present disclosure.

Systems, apparatus, and methods are described that may be configured to break a first circuit using a non-invasive second circuit. The systems, apparatus, and methods as described herein may refer to a second circuit, configured to be positioned near a first circuit, wherein the second circuit is used to monitor the first circuit.

The first circuit may include a busbar or power line configured to transfer high current. The second circuit may include a magnetic concentrator positioned near the busbar or power line, wherein the magnetic concentrator is configured to concentrate and/or direct the magnetic flux to a magnetic switch. The magnetic switch may be connected to a pyrotechnic actuator configured to break the busbar. Thus, when the pyrotechnic fuse is activated, the pyrotechnic actuator may break the current flow between the first end and the second end of the busbar. When the pyrotechnic fuse is activated, the pyrotechnic actuator may break the current flow in the first circuit.

The magnetic switch may be rotatable about an axis of rotation. The spatial position of the magnetic switch may be adjustable in relation to any one or more of the busbar or the magnetic concentrator. The position of the magnetic switch may be adjustable by rotation thereof. The different angles that may be formed by a magnetic switch during rotation thereof may correspond to different threshold currents for the current flow in the busbar. Thus, the angle of the magnetic switch relative to the magnetic concentrator may determine the threshold current.

Once the magnetic switch is rotated and positioned at an angle corresponding to a desired threshold current, when the first circuit reaches a current flow equal to or above the threshold current, the pyrotechnic actuator is automatically activated, thereby breaking the busbar.

The systems, apparatus, and methods as described herein may include a second fuse connected to the busbar and/or power line. The second fuse may be configured to disrupt residual current and/or arcing between two disconnected portions of the broken busbar (or power line). Advantageously, the pyrotechnic actuator and the second fuse together may enable breaking a high current flow within the busbar using a low capacity second fuse. The ratio between the current flow within the busbar to the breaking capacity of the second fuse may be between 1:100 and 1:500.

The apparatus may be a pyrotechnic fuse. The apparatus may include a magnetic concentrator configured to partially surround at least a portion of a busbar, wherein the magnetic concentrator may comprise an aperture, a pyrotechnic actuator (which may be coupled to the busbar, and may be configured to stop electrical flow in the busbar when the pyrotechnic actuator is activated), and a magnetic switch (which may be located near the aperture). The magnetic switch may be configured to activate the pyrotechnic actuator when a current through the busbar reaches a threshold current. An angle of the magnetic switch relative to the aperture may determine the threshold current.

The apparatus may include a magnetic concentrator configured to partially surround at least a portion of a busbar, wherein the magnetic concentrator may comprise an aperture, a pyrotechnic actuator (which may be coupled to the busbar, and may be configured to stop electrical flow in the busbar when the pyrotechnic actuator is activated), and a magnetic switch (which may be located within the aperture). The magnetic switch may be configured to activate the pyrotechnic actuator when a current through the busbar reaches a threshold current. An angle of the magnetic switch relative to the aperture may determine the threshold current.

The apparatus may include a first circuit having a high current value. The first circuit may comprise a busbar. The apparatus may include a second circuit having a low current value. The low current value may be at least one order of magnitude lower than the high current value. The second circuit may include a magnetic concentrator configured to partially surround at least a portion of the first circuit, wherein the magnetic concentrator may comprise an aperture, a pyrotechnic actuator coupled to the first circuit (which may be configured to substantially reduce electrical flow in the first circuit when the pyrotechnic actuator is activated), and a magnetic switch (which may be located near the aperture). The magnetic switch may be configured to activate the pyrotechnic actuator when a current in the first circuit reaches a threshold current. The threshold current may be based on an angle of the magnetic switch relative to the aperture.

The method may include positioning a magnetic concentrator around at least a portion of a busbar. The magnetic concentrator may comprise an aperture and a magnetic switch. An angle of the magnetic switch (which may be near or within the aperture) may determine a threshold current. The magnetic switch may form a circuit with a pyrotechnic actuator. Activating the pyrotechnic actuator when a current of the busbar reaches the threshold current may stop electrical flow in the busbar.

The system may include a busbar, a magnetic concentrator (which may be configured to partially surround at least a portion of the busbar, and may comprise an aperture), a pyrotechnic actuator (which may be coupled to the busbar and may be configured to stop electrical flow in the busbar when the pyrotechnic actuator is activated(, and a magnetic switch (which may be located near or within the aperture). The magnetic switch may be configured to activate the pyrotechnic actuator when a current in the busbar reaches a threshold current. An angle of the magnetic concentrator relative to the aperture may determine the threshold current.

The magnetic switch may be rotatable in relation to the aperture about an axis of rotation. The magnetic concentrator may include a yoke. The magnetic concentrator may be composed of a ferromagnetic material. The magnetic concentrator may have a U-shape. The magnetic concentrator may have a chamfer around one or more edges of the magnetic concentrator. The magnetic concentrator may include an inner surface, and the smallest distance between a point on the inner surface and the busbar may be substantially equal for all points along the inner surface. The magnetic concentrator may include an inner wall, and the inner wall may be parallel to at least two outer walls of the busbar.

The apparatus may include a current sensor. The current sensor may comprise the magnetic concentrator and the magnetic switch. The magnetic switch may have one or more markings associated with one or more values of the threshold current. The magnetic switch may be within a first proximity of a middle of the busbar. The first proximity may be a distance of less than 15 mm. The magnetic concentrator may be within a second proximity of a middle of the busbar. The magnetic switch may form a circuit, wherein the circuit may include a pyrotechnic fuse, and wherein a current in the circuit may be determined by the angle of the magnetic switch in relation to the magnetic concentrator.

The threshold current may be at least one order of magnitude smaller than the current of the busbar. The pyrotechnic actuator may be configured to mechanically disconnect the busbar. The magnetic switch may include a reed switch. The magnetic switch may include a hall effect switch. The current of the circuit of the magnetic switch may be configured to automatically activate the pyrotechnic actuator when the current of the busbar is equal to or greater than the threshold current. The busbar may include a single unit of conducting material.

BRIEF DESCRIPTION OF THE DRAWINGS

The present disclosure is illustrated by way of example and is not limited in the accompanying figures in which like reference numerals indicate similar elements and in which.

DETAILED DESCRIPTION

In the following description, reference is made to the accompanying drawings, which form a part hereof, and in which are shown, by way of illustration, various examples of the disclosure. It is to be understood that the examples shown and/or described are non-exclusive, and other examples may be practiced, and structural and functional modifications may be made without departing from the scope of the present disclosure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Apparatuses, systems and methods disclosed herein may be configured to halt electric current flow within a circuit when a threshold current level is detected.

Figure 1:
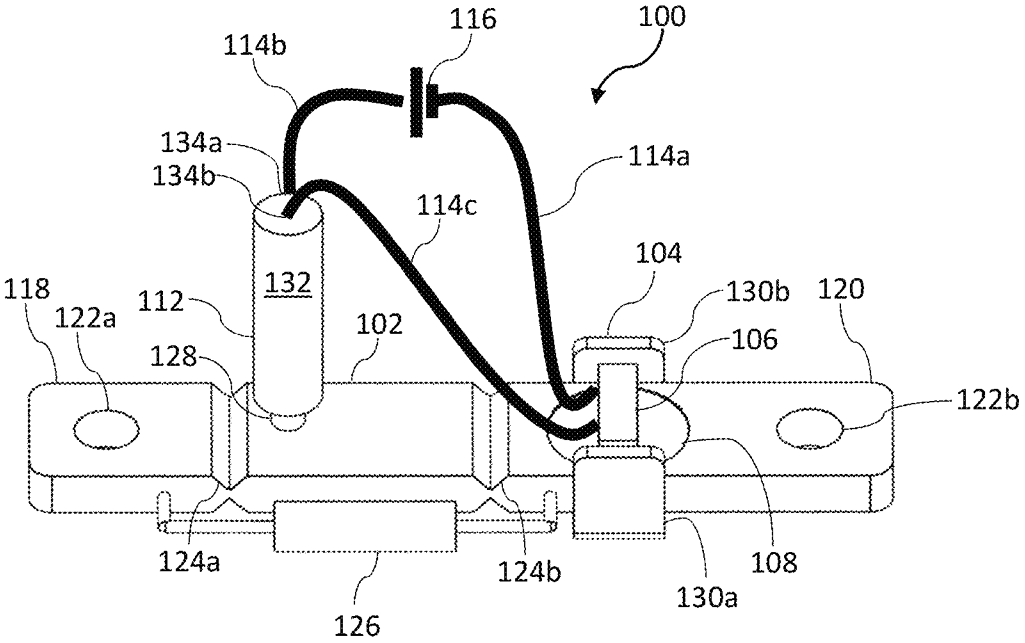
FIG. 1 shows a perspective view simplified illustration of a pyrotechnic fuse.
Figure 2:
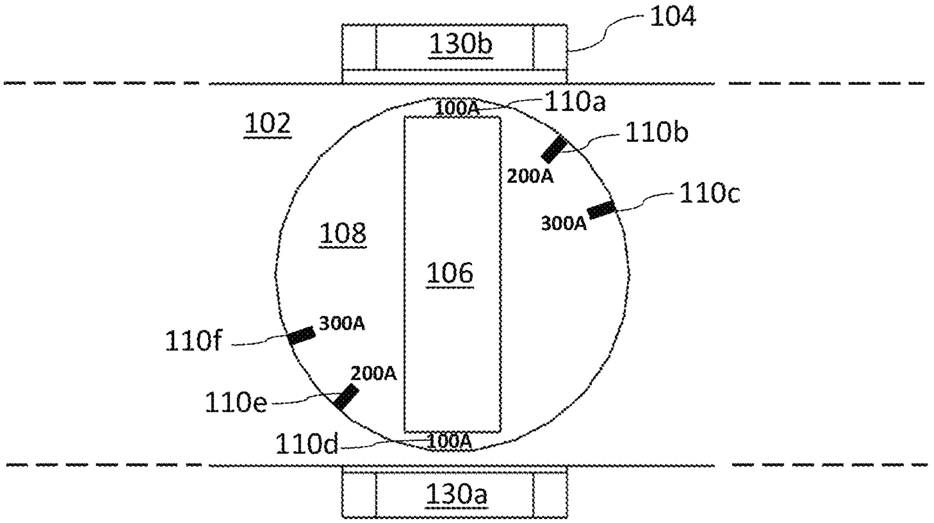
FIG. 2 shows a top view simplified illustration of a magnetic concentrator and magnetic switch.
Figure 3A:
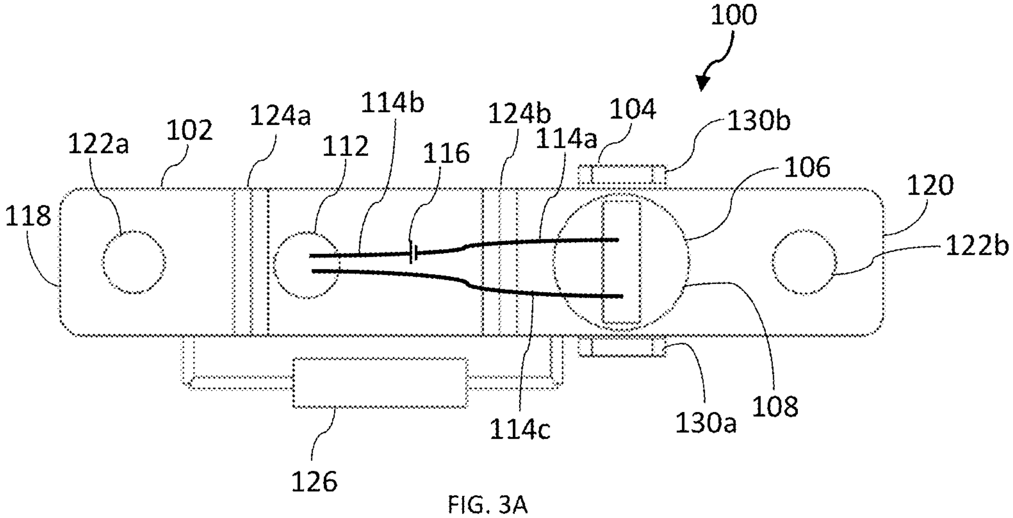
FIG. 3A and FIG. 3B show top view and side view simplified illustrations of a pyrotechnic fuse.
Figure 3B:
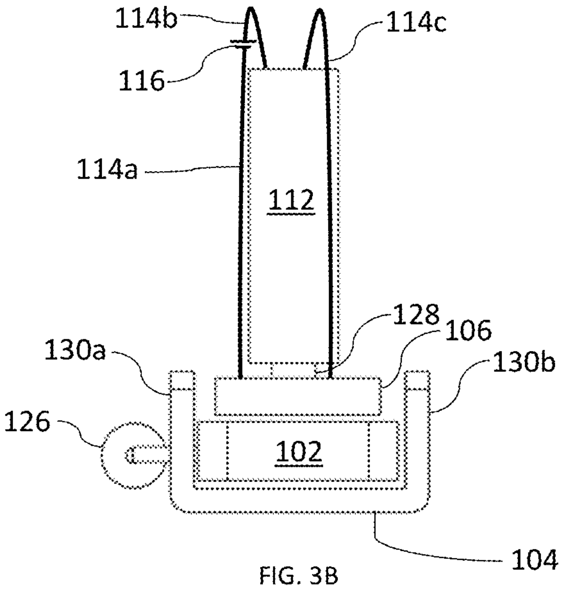
Figure 4:
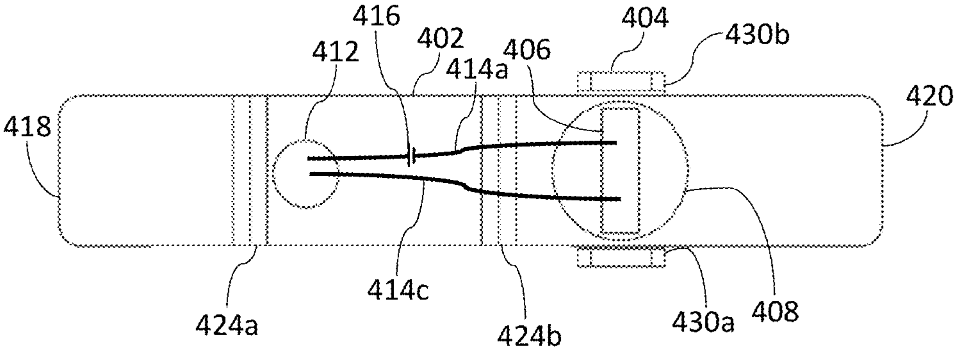
FIG. 4 shows a top view simplified illustration of a pyrotechnic fuse.

Reference is made to FIG. 1, which shows a perspective view simplified illustration of a pyrotechnic fuse, and to FIG. 2, which shows a top view simplified illustration of a magnetic concentrator and magnetic switch, and to FIG. 3A and FIG. 3B which show top view and side view simplified illustrations of a pyrotechnic fuse, and to FIG. 4, which shows a top view simplified illustration of a pyrotechnic fuse.

The apparatus 100 may include a busbar 102. The apparatus 100 may include a magnetic concentrator 104 configured to partially surround at least a portion of the busbar 102. The magnetic concentrator 104 may include an aperture. The apparatus 100 may include a pyrotechnic actuator 112. The pyrotechnic actuator 112 may be coupled to the busbar 102. The pyrotechnic actuator 112 may be configured to stop electrical flow in the busbar 102 when the pyrotechnic actuator 112 is activated. The apparatus 100 may include a magnetic switch 106. The magnetic switch 106 may be located near the aperture of the magnetic concentrator 104. The magnetic switch 106 may be configured to activate the pyrotechnic actuator 112 when a current through the busbar 102 reaches a threshold current.

The apparatus 100 may form a first circuit comprising the busbar 102, wherein at least a portion of the current flowing through the first circuit may flow through the busbar 102. The apparatus 100 may be a part of a first circuit comprising the busbar 102, wherein at least a portion of the current flowing through the first circuit may flow through the busbar 102. The apparatus 100 may form a second circuit, the second circuit comprising at least one of the magnetic switch 106 and the pyrotechnic actuator 112.

The busbar 102 may be a strip or bar. The busbar 102 may be composed of an electrically conductive material. The busbar 102 may be a single unit of conducting material. The busbar 102 may be configured to enable high current power distribution. The busbar 102 may be configured to enable high current flows therethrough. The high current flows within the busbar 102 may range between 10 and 500 amperes. The high current flows within the busbar 102 may range between 50 and 700 amperes. The high current flows within the busbar 102 may be larger than 10 amperes.

The busbar 102 may include a first end 118 and a second end 120. The first end 118 and the second end 120 may be coupled with one or more conductive elements, which may form the first circuit as described in greater detail elsewhere herein. The first end 118 of the busbar may include one or more openings 122, such as the opening 122*a*. The second end 120 of the busbar may include one or more openings 122, such as the opening 122*b*. The one or more openings 122 may be configured to receive one or more connectors, thereby electrically connecting one or more of the first end 118 and the second end 120 to a conductive element coupled to the one or more connectors. The one or more openings 122 may be configured to receive any one or more of an anchor, a bolt, a clamp or a welding. The first end 118 and/or the second end 120 may be configured to form a joint wherein the joint connects the first end 118 and/or the second end 120 within the first circuit.

The busbar 102 may include one or more divots 124*a* and/or 124*b* (collectively referred to herein as one or more divots 124). The one or more divots 124 may include at least a portion of the busbar 102 configured to break when the busbar is under positive and/or negative force. The one or more divots 124 may include one or more cross sections of the busbar 102. The one or more divots 124 may include one or more indentations in one or more surfaces of the busbar 102. The one or more divots 124 may include two indentations positioned at opposing surfaces of the busbar 102. The one or more divots 124 may be a portion of the busbar 102 that has a smaller thickness than the rest of the busbar 102. The one or more divots 124 may include one or more dimples in at least one surface of the busbar 102. The one or more divots 124 may include one or more perforations in the busbar 102.

The one or more divots 124 may include at least one first divot 124*a* and a second divot 124*b*. The first divot 124*a* may be located between the second divot 124*b* and the first end 118. The second divot 124*b* may be located between the first divot 124*a* and the second end 120. The pyrotechnic actuator 112 may be configured to apply a force onto the busbar between the first divot 124*a* and the second divot 124*b*.

The pyrotechnic actuator 112 may include a housing 132 positioned in proximity to the busbar 102. The housing 132 of the pyrotechnic actuator 112 may be configured to encase one or more components of the pyrotechnic actuator 112, such as, for example, an extendable portion 128, an actuator, a piston, an initiator, one or more wires or cables, and the like. The housing 132 of the pyrotechnic actuator 112 may be configured to electrically connect to the magnetic switch 106, such as described in greater detail elsewhere herein. The housing 132 may include one or more terminals 134*a* or 134*b* configured to electrically connect one or more cables, such as, for example, cables 114, to one or more components of the pyrotechnic actuator 112, such as, for example, the initiator.

Figure 5A:
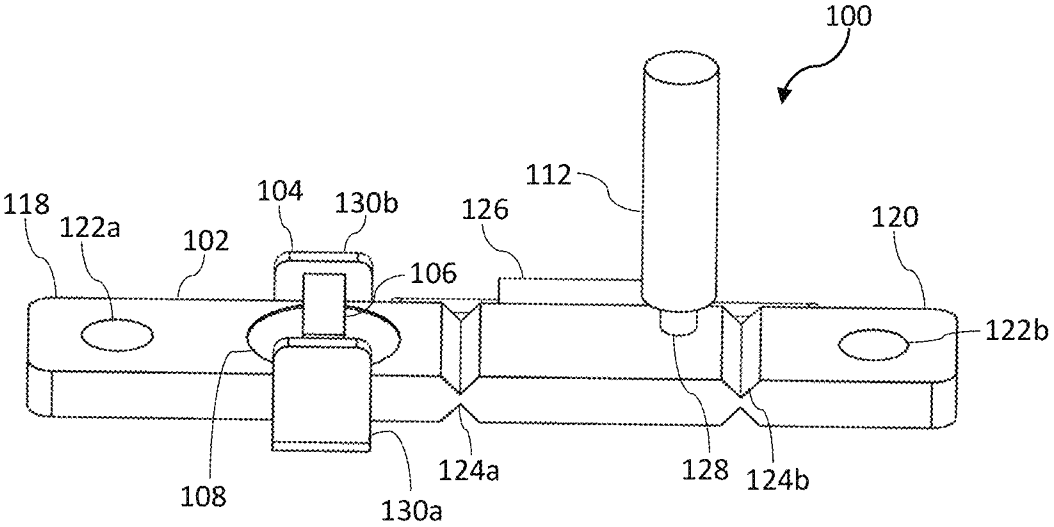
FIG. 5A and FIG. 5B show perspective view simplified illustrations of a pyrotechnic fuse before and after activation of a pyrotechnic actuator, respectively.
Figure 5B:
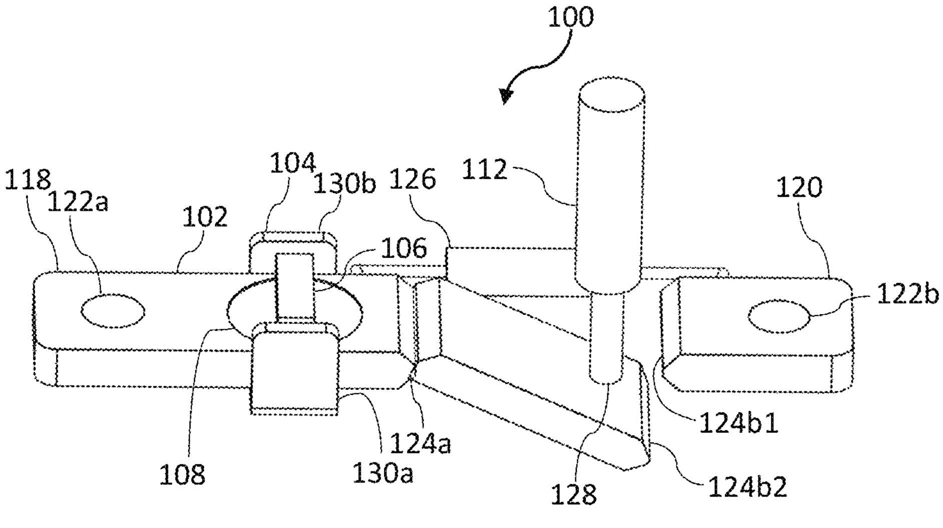

Reference is made to FIG. 5A and FIG. 5B, which show perspective view simplified illustrations of a pyrotechnic fuse before and after activation of a pyrotechnic actuator, respectively.

The pyrotechnic actuator 112 may include the extendable portion 128. The extendable portion 128 may be configured to extend towards the busbar 102. The pyrotechnic actuator 112 and/or the extendable portion 128 may include an actuator and/or a piston. The pyrotechnic actuator 112 may be disposed on the busbar such that the extendable portion 128 reaches a surface of the busbar 102. The pyrotechnic actuator 112 may be disposed on the busbar such that the extendable portion 128 reaches between the first divot 124*a* and the second divot 124*b* of the busbar 102. The extendable portion 128 may be configured to extend in relation to the housing 132.

The extendable portion 128 may be configured to extend towards the busbar 102, when the pyrotechnic actuator 112 is activated, which may apply a force to the busbar 102 and may mechanically break (or disconnect) the busbar 102, such as may be depicted in FIG. 5B. The extendable portion 128 may be configured to extend towards the busbar 102, when the pyrotechnic fuse 112 is activated, thereby causing at least one of the one or more divots 124 to mechanically fail, or in other words, break. Thus, when the pyrotechnic actuator 112 is activated, the pyrotechnic actuator 112 may break the current flow between the first end 118 and the second end 120 of the busbar 102. Thus, when the pyrotechnic actuator 112 is activated, the pyrotechnic actuator 112 may break the current flow in the first circuit.

The initiator of the pyrotechnic actuator 112 may be configured to initiate a movement of the extendable portion 128 towards the busbar 102. The initiator may be triggered by current flow. The initiator may be connected to the one or more terminals 134 and/or to the one or more cables 114 (as may be depicted in FIG. 1, FIG. 3A, or FIG. 3B). The initiator may be configured to receive a current flow from the magnetic switch 106. Thus, the initiator, upon receiving a current, is configured to trigger the movement of the extendable portion 128 relative to the busbar and/or the housing 132.

The one or more cables 114 may include a conductive element configured to enable current flow therein. The one or more cables may include one or more wires. The one or more cables may be surrounded by an insulation (or an insulating material). The one or more cables 114 may include a first cable 114*a* coupled to the magnetic switch 106. The one or more cables 114 may include a second cable 114*b* coupled to the pyrotechnic actuator 112. The second cable 114*b* may be coupled to one or more of the terminals 134 of the pyrotechnic actuator 112. The first cable 114*a* may be coupled to a power supply 116. The second cable 114*b* may be coupled to the power supply 116. The power supply 116 may be coupled to the first cable 114*a* at a first end thereof and to the second cable 114*b* at a second end thereof. In other words, the power supply 116 may be disposed between the first cable 114*a* and the second cable 114*b*.

The one or more cables 114 may include a third cable 114*c*. The third cable 114*c* may be coupled to one or more of the terminals 134 of the pyrotechnic actuator 112. The third cable 114*c* may be coupled to the magnetic switch 106. The third cable 114*c* may be coupled to the pyrotechnic actuator 112 at a first end thereof, and to the magnetic switch 106 at a second end thereof. The one or more cables 114 may form the second circuit, as explained in greater detail elsewhere herein. The one or more cables 114 may electrically connect the magnetic switch 106 and the pyrotechnic actuator 112. Thus, the second circuit may include the one or more cables 114, the magnetic switch 106, and/or the pyrotechnic actuator 112. The second circuit may include the power supply 116.

The apparatus 100 may include a magnetic concentrator 104. The magnetic concentrator 104 may be configured to concentrate a magnetic flux generated by the current flow in the busbar 102. The magnetic concentrator 104 may be a magnetic field concentrator.

The magnetic concentrator 104 may be configured to intensify the magnetic flux generated by the current flow in the busbar 102. The magnetic concentrator 104 may be configured to direct the magnetic flux generated by the current flow in the busbar 102. The magnetic concentrator 104 may be configured to direct the magnetic flux generated by the current flow in the busbar 102 to the magnetic switch 106. The magnetic concentrator 104 may be composed of a ferromagnetic material.

The magnetic concentrator 104 may include a yoke. The magnetic concentrator 104 may be configured to at least partially surround the busbar 102. The magnetic concentrator 104 may be configured to at least partially surround the busbar 102 around a longitudinal axis of the busbar 102. The magnetic concentrator 104 may be configured to at least partially surround the busbar 102 such that at least a portion of the magnetic concentrator 104 crosses the longitudinal axis of the busbar 102. The magnetic concentrator 104 may be configured to at least partially surround the busbar 102 such that at least a portion of the magnetic concentrator 104 may be essentially perpendicular to the longitudinal axis of the busbar 102. The magnetic concentrator 104 may be U-shaped.

The magnetic concentrator 104 may have one or more walls 130*a* or 130*b* (collectively referred to as walls 130) configured to at least partially surround the busbar 102. The one or more walls 130 may have a consistent thickness. The one or more walls 130 may have a varying thickness. The one or more walls 130 may be tapered or chamfered. The magnetic concentrator 104 may have a chamfer around one or more edges of the magnetic concentrator 104 and/or the one or more walls 130 of the magnetic concentrator 104. The magnetic concentrator 104 may have 90 degree angles between one or more walls 130 of the magnetic concentrator 104. The magnetic concentrator 104 may have a U-shape. The magnetic concentrator 104 may have an L-shape. The magnetic concentrator 104 may have a V-shape.

The magnetic concentrator 104 (and/or one or more walls 130 of the magnetic concentrator 104) may include an inner surface. The smallest distance between a point on the inner surface and the busbar 102 may be substantially equal for all points along the inner surface of the magnetic concentrator 104. The distance between the inner surface and the busbar 102 may be vary along the inner surface of the magnetic concentrator 104. The distance between the inner surface and the busbar 102 may be the same along the inner surface of the magnetic concentrator 104. The inner surface may be parallel to one or more surfaces of the busbar 102. The one or more walls 130 of the magnetic concentrator 104 may be parallel to one or more surfaces of the busbar 102.

The one or more walls 130 may be parallel to each other. The one or more walls 130 may be disposed on opposing sides of the busbar 102. The one or more walls 130 may extend from the busbar 102 to an area part the busbar 102, or in other words, the one or more walls 130 may extend past the busbar 102. The one or more walls 130 and/or the magnetic concentrator 104 may form an aperture.

The aperture may include an opening which disrupts the magnetic concentrator 104 from completely surrounding the busbar 102. The aperture may include an opening in the one or more walls 130 of the magnetic concentrator 104. The aperture may include an opening which has a perimeter formed by the one or more walls of the magnetic concentrator 104. The aperture may be sized to fit at least a portion of the magnetic switch 106 therein.

The magnetic switch 106 may be positioned near or within an aperture of the magnetic concentrator 104. At least a portion of the magnetic switch 106 may be positioned near or within the aperture of the magnetic concentrator 104. The magnetic switch 106 may include a reed switch. The magnetic switch 106 may form a current sensor. The current sensor may include the magnetic switch 106 and/or the magnetic concentrator 104. The magnetic switch 106 may include (or be a part of) a hall effect switch. The magnetic switch 106 may include (or be a part of) a transistor switch. The magnetic switch 106 may include a conductive bar.

The magnetic switch 106 may be configured to receive the directed magnetic flux from the magnetic concentrator 104. The magnetic switch 106 may be coupled to the one or more cables 114, such as, for example, the first cable 114*a* and the third cable 114*c*.

The magnetic switch 106 may be disposed between the first end 118 and the second end 120 of the busbar 102. The magnetic switch 106 may be disposed between the second end 120 of the busbar 102 and the second divot 124*b*. The magnetic switch 106 may be within a first proximity of a middle of the busbar. The first proximity may be a distance of less than 15 mm. The first proximity may be a distance of between 5 and 25 mm. The first proximity may be a distance of less than 15 mm. The first proximity may be a distance of between 10 and 55 mm. The magnetic switch 106 may be within a second proximity of a middle of the busbar 102. The second proximity may be a distance of less than 15 mm. The second proximity may be a distance of between 5 and 25 mm. The second proximity may be a distance of between 10 and 55 mm.

The magnetic switch 106 may be configured to sense the directed magnetic flux from the magnetic concentrator 104. The magnetic switch 106 may be at least partially composed of a metallic material. The magnetic switch 106 may be least partially composed of a ferromagnetic material.

The magnetic switch 106 may be rotatable about an axis of rotation (a first axis of rotation). The magnetic switch 106 may be rotatable in relation to the aperture. The magnetic switch 106 may be rotatable in relation to the magnetic concentrator 104. The magnetic switch 106 may be rotatable in relation to the busbar 102. The axis of rotation of the magnetic switch 106 may be substantially perpendicular to the longitudinal axis of the busbar 102. The axis of rotation of the magnetic switch 106 may be substantially perpendicular to the direction of current flow in the busbar 102. The axis of rotation of the magnetic switch 106 may be substantially perpendicular to one or more of the walls of the magnetic concentrator 104.

The magnetic switch 106 may be coupled to the pyrotechnic actuator 112, thereby forming the second circuit. A current flowing in the magnetic switch 106, and therefore in the second circuit, may be determined by an angle of the magnetic switch 106 in relation to the magnetic concentrator 104. The current flowing in the magnetic switch 106, and therefore in the second circuit, may be determined by an angle of the magnetic switch 106 in relation to the busbar 102.

The rotation of the magnetic switch 106 (or, in other words, the angle of the magnetic switch 106) may affect a current in the second circuit. The current in the magnetic switch 106 may depend on the angle of the magnetic switch 106, since a voltage generated across the magnetic switch 106 may be proportional to the magnetic field concentrated and/or directed by the magnetic concentrator 104.

The magnetic switch 106 may be coupled to the pyrotechnic actuator 112 such that the activation of the pyrotechnic actuator 112 is based on a threshold current. The threshold current may be a current value for the current flow in the busbar 102, which, when the current value is reached, may cause the magnetic switch 106 to send a current signal to pyrotechnic actuator 112, which may activate the pyrotechnic actuator 112. The current of the second circuit, and/or the current flow in the magnetic switch 106, may be configured to automatically activate the pyrotechnic actuator 112 when the current of the busbar 102 is equal to or greater than the threshold current. The threshold current of the busbar 102 may be chosen based on the angle of the magnetic switch 106 relative to any one or more of the aperture of the magnetic concentrator 104, the magnetic concentrator 104, and/or the busbar 102.

Since a magnetic field level of the magnetic concentrator 104 may be proportional to the current flowing through the busbar 102, the threshold current may be proportional to the magnetic field level of the magnetic concentrator 104. Thus, the angle of the magnetic switch 106 relative to the aperture of the magnetic concentrator 104 may determine the threshold current. Thus, the magnetic switch 106 may enable a non-invasive measurement and safety mechanism (the activation of the pyrotechnic actuator 112) where the second circuit is not electrically connected to the first circuit.

The magnetic switch 106 may be coupled to a dial 108. The dial 108 may include a plate. The dial 108 may include a base for the magnetic switch 106 to rotate on. The dial 108 may rotate with the magnetic switch 106. The dial 108 may be stationary (of fixed) in relation to the busbar 102 and/or the magnetic concentrator 104, such that during rotation of the magnetic switch 106, the magnetic switch 106 may rotate in relation to the dial 108. The dial 108 may include one or more markings 110*a*, 110*b*, 110*c*, 110*d*, 110*e*, or 110*f* (collectively referred to herein as one or more markings 110).

The one or more markings may be associated with one or more values of the threshold current. The one or more markings may indicate one or more current values positioned such that when the magnetic switch 106 is aligned with one of the markings, the threshold current is set as the current value indicated by the marking the magnetic switch 106 is aligned with. The one or more markings 110 may be positioned on the dial at one or more different angles, wherein each marking is indicative of a current value such that the angle in which the marking is placed corresponds to a threshold current that would be set by the magnetic switch 106 at the angle of the markings.

The one or more markings may show a current value of 100, 200, 300, 400, 500, 600, 700, and/or 1000 amperes or any range therebetween. The one or more markings may show a current value of between 50 and 1000 amperes, or any range therebetween. The one or more markings may show a current value of between 50 and 300 amperes, or any value therebetween. The one or more markings may show a current value of between 250 and 450 amperes. The one or more markings may show a current value of between 50 and 400 amperes. The one or more markings may show a current value of between 50 and 500 amperes. The one or more markings may show a current value of between 200 and 1000 amperes.

The threshold current set by the magnetic switch 106 may be at least one order of magnitude smaller than the value of the current of the busbar 102. The threshold current set by the magnetic switch 106 may be at least two orders of magnitude smaller than the value of the current of the busbar 102.

The magnetic switch 106 may be configured to rotate about a second axis of rotation. The second axis of rotation may be a pitch axis (wherein the first axis of rotation may be a yaw axis of rotation). The magnetic switch 106 may be positioned at a different height in relation to the busbar 102 and/or in relation to the magnetic concentrator 104 (or, in other words, at different distances from the busbar 102 and/or in relation to the magnetic concentrator 104). Positioning of the magnetic switch 106 at different distances and angels may result in different threshold currents that can be set by the magnetic switch 106.

The apparatus 100 and/or the pyrotechnic actuator 112 may have a breaking capacity between 500 and 40000 amperes. The apparatus 100 and/or the pyrotechnic actuator 112 may have a breaking capacity between 5000 and 40000 amperes. The apparatus 100 and/or the pyrotechnic actuator 112 may have a breaking capacity between 1000 and 35000 amperes. The apparatus 100 and/or the pyrotechnic actuator 112 may have a breaking capacity between 500 and 30000 amperes.

The apparatus 100 may include a second fuse 126 configured to disrupt residual current and/or arcing. The second fuse 126 may be configured to disrupt current flow from the first end 118 to the second end 120 (or vice versa). The second fuse 126 may be configured to disrupt current flow after the pyrotechnic actuator 112 breaks the busbar 102. The second fuse 126 may be a current limiting fuse. The second fuse 126 may comprise sand. The second fuse 126 may be a sand fuse. The sand in the second fuse 126 may be configured to melt when heated, which may occur when current flows through the second fuse 126.

The second fuse 126 may be different than the pyrotechnic actuator 112. The second fuse 126 may include a metal wire or strip that melts when a current above a current threshold flows through the second fuse 126. The current threshold of the second fuse 126 may be different than the current threshold of the busbar 102.

The current threshold of the second fuse 126 may be smaller than 100 amperes. The current threshold of the second fuse 126 may be smaller than 50 amperes. The current threshold of the second fuse 126 may be smaller than 10 amperes. The ratio of the current threshold of the second fuse 126 to the current threshold of the busbar 102 may range between 1:10 to 1:500.

The second fuse 126 may be connected between the first end 118 and the second end 120 of the busbar 102. The second fuse 126 may be connected, at a first end thereof, between the first end 118 of the busbar and the first divot 124*a*. The second fuse 126 may be connected, at a second end thereof, between the second end 120 of the busbar and the second divot 124*b*. The second fuse 126 may be connected, at a second end thereof, at a location along the busbar 102 that is between the second divot 124*b* and the magnetic concentrator 104.

Advantageously, an apparatus comprising the pyrotechnic actuator 112 and the second fuse 126 together may enable breaking a high current flow within the busbar 102 using a low capacity second fuse 126. Thus, the ratio between the current flow within the busbar 102 to the breaking capacity of the second fuse 126 may be 1:100. The ratio between the current flow within the busbar 102 to the breaking capacity of the second fuse 126 may be 1:500. The ratio between the current flow within the busbar 102 to the breaking capacity of the second fuse 126 may be 1:400.

Figure 6:
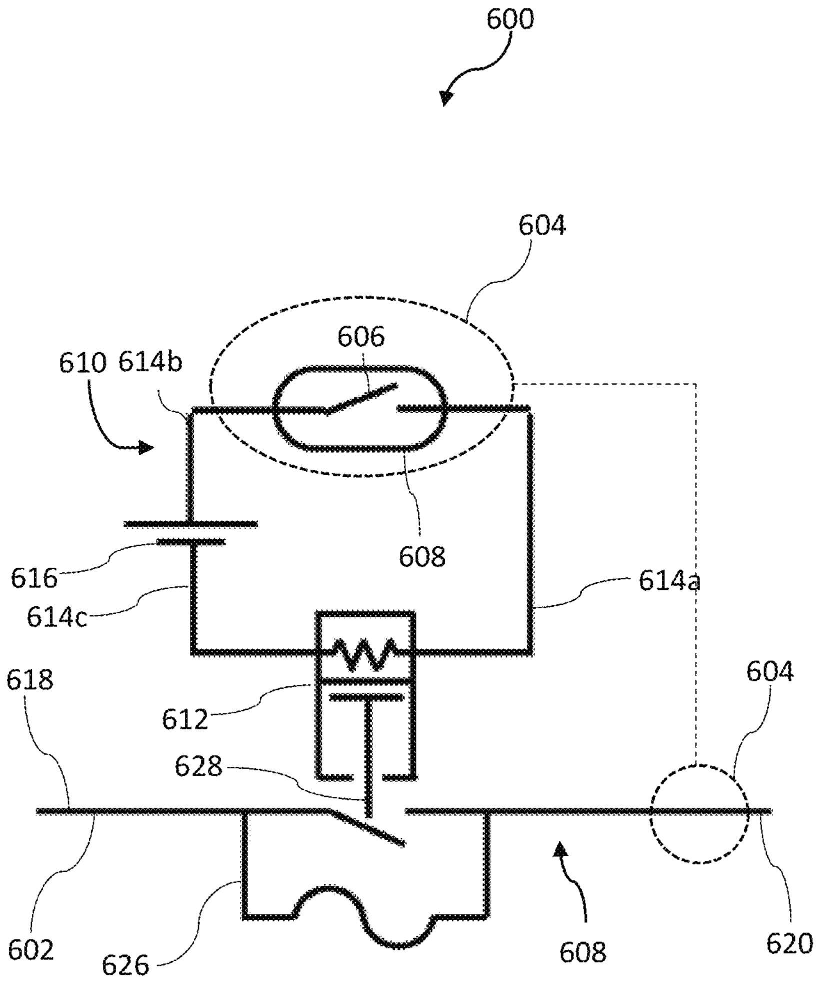
FIG. 6 shows a schematic illustration of a first circuit and a second circuit.

Reference is made to FIG. 6, which shows a schematic illustration of a first circuit and a second circuit. The system 600 depicted in FIG. 6 may include one or more aspects of the apparatus 100 as described herein. The system 600 may include the apparatus 100 as depicted in any one of FIG. 1, FIG. 2, FIG. 3A, FIG. 3B, FIG. 4, FIG. 5A, and/or FIG. 5B.

The system 600 may include a first circuit 608 and a second circuit 610. The first circuit 608 may have a high current value, or in other words, may have high current levels flowing therethrough. The high current flows within the first circuit 608 may range between 10 and 500 amperes. The high current flows within the first circuit 608 may range between 50 and 700 amperes. The high current flows within the first circuit 608 may be larger than 10 amperes.

The second circuit 610 may have low current value, or in other words, may have low current levels flowing therethrough. The low current flows within the second circuit 610 may range between 0.5 and 50 amperes. The low current flows within the second circuit 610 may range between 1 and 35 amperes. The low current flows within the second circuit 610 may range between 2 and 15 amperes.

The current of the second circuit 610 may be at least one order of magnitude lower than the current of the first circuit 608. The current of the second circuit 610 may be at least 1.5 order of magnitude lower than the current of the first circuit 608. The current of the second circuit 610 may be at least two orders of magnitude lower than the current of the first circuit 608.

The first circuit 608 may include a power line 602. The power line 602 may include a busbar, such as, for example, the busbar 102 of the apparatus 100. The power line 602 may have high current flowing therethrough. The power line 602 may have a first end 618 and a second end 620. The first end 618 and the second end 620 may be coupled with one or more conductive elements, thereby forming the first circuit 608 therewith.

The second circuit 610 may include any one or more of the one or more cables 614 (which may be cables 114), the power supply 616 (which may be power supply 116), or the magnetic switch 606 (which may be the switch 106). The system 600 may include a magnetic concentrator, such as the magnetic concentrator 104. The magnetic concentrator may be configured to surround at least a portion of the first circuit 608. The magnetic concentrator may be positioned in a vicinity of the first circuit 608 such that a magnetic flux generated by the current flow within the power line 602 may be concentrated in the magnetic concentrator. The magnetic concentrator may be positioned near the power line 602 and/or surrounding the power line 602. The magnetic concentrator may be positioned around a portion of the power line 602, such as the portion depicted by a circle 604. The magnetic concentrator may include an aperture, such as explained in greater detail elsewhere herein.

The system 600 and/or the second circuit 610 may include a magnetic switch 606. The magnetic switch 606 may be located near the aperture. At least a portion of the magnetic switch 606 may be located in the aperture. The magnetic switch 606/106 may be configured to activate a pyrotechnic actuator 612 (which may be the pyrotechnic actuator 112) when a current in the first circuit 608 reaches a threshold current.

The system 600 and/or the second circuit 610 may include the pyrotechnic actuator 612. The pyrotechnic actuator 612 may be electrically coupled to the second circuit 610. The pyrotechnic actuator 612 may be positioned near and/or abutting to a portion of the first circuit 608. The pyrotechnic actuator 112/612 may be positioned near and/or abutting to a portion of the power line 602 of the first circuit 608. The pyrotechnic actuator 612 may be configured to substantially reduce electrical flow in the first circuit 608 when the pyrotechnic actuator 612 is activated.

The pyrotechnic actuator 612 may include a extendable portion 628 (which may be the extendable portion 128). The extendable portion 628 may be configured to extend towards the power line 602. The pyrotechnic actuator 612 and/or the extendable portion 628 may include an actuator and/or a piston. The pyrotechnic actuator 612 may be disposed on the busbar such that the extendable portion 628 reaches a surface of the power line 602. The pyrotechnic actuator 612 may be disposed on the power line 602 such that the extendable portion 628 reaches between the first end 618 (which may be first end 118) and the second end 620 (which may be second end 120) of the power line 602.

When the pyrotechnic actuator 612 is activated, the pyrotechnic actuator 612 may apply a force to the power line 602, which may mechanically break (or disconnect) the power line 602 and/or a portion of the first circuit 608. Thus, when the pyrotechnic actuator 612 is activated, the pyrotechnic actuator 612 may break the current flow between the first end 618 and the second end 620 of the power line 602. Thus, when the pyrotechnic actuator 612 is activated, the pyrotechnic actuator 612 may break the current flow in the first circuit 608.

The pyrotechnic actuator 612 may include an initiator configured to initiate a movement of the extendable portion 628 towards the power line 602. The initiator may be triggered by a threshold current. The initiator may be connected to one or more terminals of the pyrotechnic actuator 612 via one or more cables 614. The initiator may be configured to receive a current flow from the magnetic switch 606. Thus, the initiator, upon receiving current, is configured to trigger the movement of the extendable portion 628 relative to the power line 602.

The magnetic switch 606 may be rotatable about an axis of rotation (a first axis of rotation). The magnetic switch 606 may be rotatable in relation to the aperture. The magnetic switch 606 may be rotatable in relation to the magnetic concentrator. The magnetic switch 606 may be rotatable in relation to the first circuit 608 and/or the power line 602. The axis of rotation of the magnetic switch 606 may be essentially perpendicular to the longitudinal axis of the power line 602. The axis of rotation of the magnetic switch 606 may be substantially perpendicular to the direction of current flow in the power line 602. The axis of rotation of the magnetic switch 606 may be essentially perpendicular to one or more of the walls of the magnetic concentrator.

The current flowing in the magnetic switch 606, and therefore in the second circuit 610, may be determined by an angle of the magnetic switch 606 in relation to the magnetic concentrator and/or the power line 602. The current flowing in the magnetic switch 606, and therefore in the second circuit 610, may be determined by an angle of the magnetic switch 606 in relation to aperture. The current flowing in the magnetic switch 606, and therefore in the second circuit, may be determined by an angle of the magnetic switch 606 in relation to the one or more portions of the first circuit 608.

The magnetic switch 606 may be coupled to the pyrotechnic actuator 612 such that the activation of the pyrotechnic actuator 612 is based on a threshold current. The threshold current may be a current value for the current flow in the power line 602 and/or in the first circuit 608. When a current value is reached, the magnetic switch 606 may send a current signal to pyrotechnic actuator 612, which may activate the pyrotechnic piston 612. The current of the second circuit 610, and/or the current flow in the magnetic switch 606, may be configured to automatically activate the pyrotechnic actuator 612 when the current of the first circuit 608 is equal to or greater than the threshold current. The threshold current of the first circuit 608 (and/or the power line 602) may be chosen based on the angle of the magnetic switch 606 relative to any one or more of the aperture of the magnetic concentrator, the magnetic concentrator, or the power line 602.

The system 600 may include a second fuse 626, such as the second fuse 126. The second fuse 626 may be configured to disrupt residual current and/or arcing in the first circuit 608. The second fuse 626 may be configured to disrupt current flow from the first end 618 to the second end 620 (or vice versa) of the first circuit 608. The second fuse 626 may be configured to disrupt current flow after the pyrotechnic actuator 612 breaks the first circuit 608. The second fuse 626 may be a current limiting fuse. The second fuse 626 may comprise sand. The second fuse 626 may be a sand fuse. The sand in the second fuse 626 may be configured to melt when heated, which may occur when current flows through the second fuse 626.

Figure 7A:
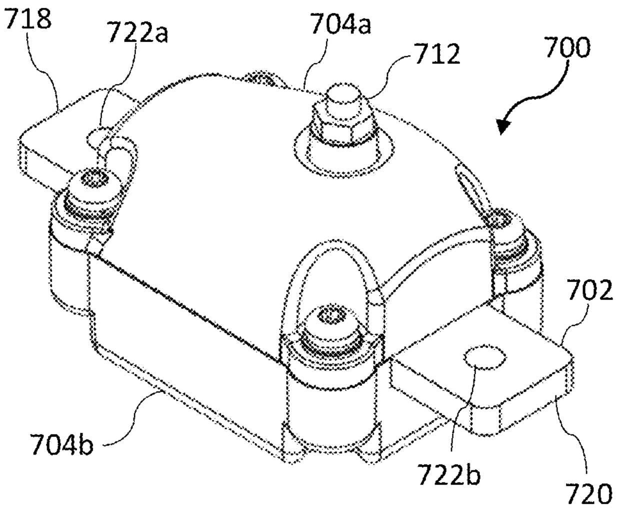
FIG. 7A shows a perspective view simplified illustration of a pyrotechnic fuse.
Figure 7B:
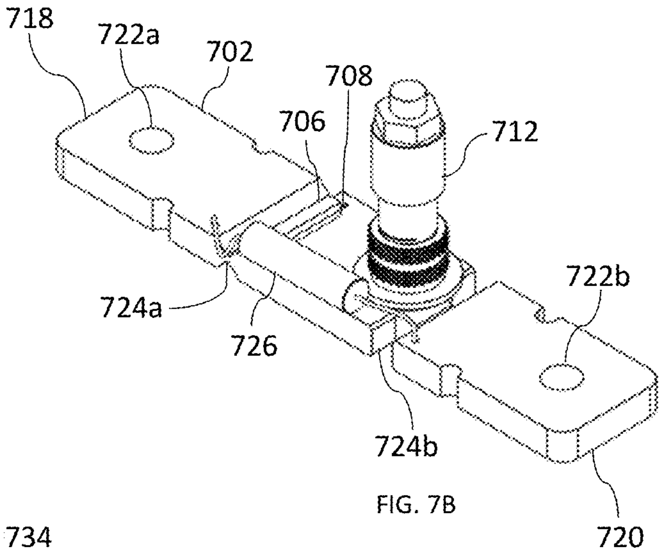
FIG. 7B shows a perspective view simplified illustration of a portion of a pyrotechnic fuse.
Figure 7C:
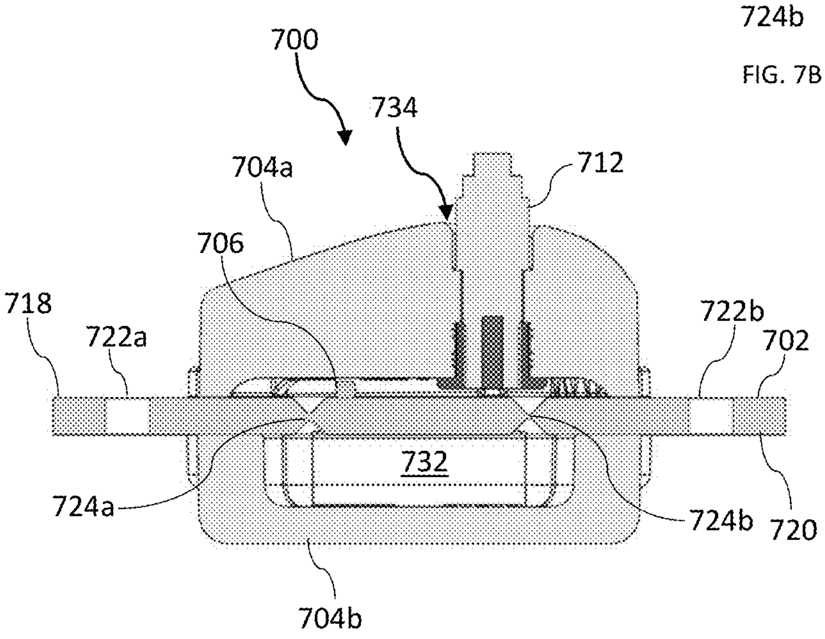
FIG. 7C shows a cross section view simplified illustration of a portion of a pyrotechnic fuse.
Figure 7D:
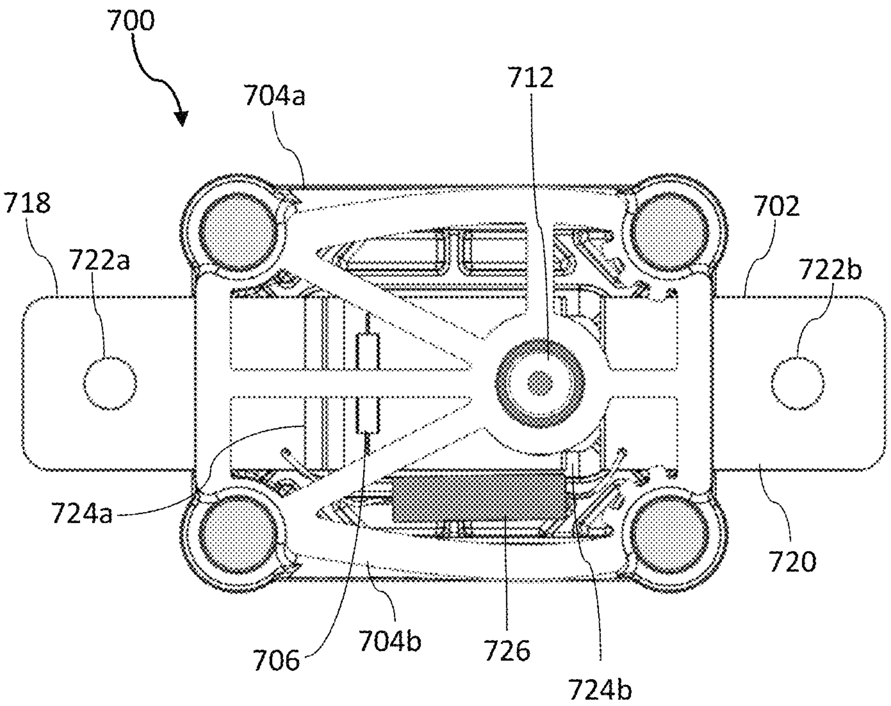
FIG. 7D shows a cross section view simplified illustration of a portion of a pyrotechnic fuse.
Figure 7E:
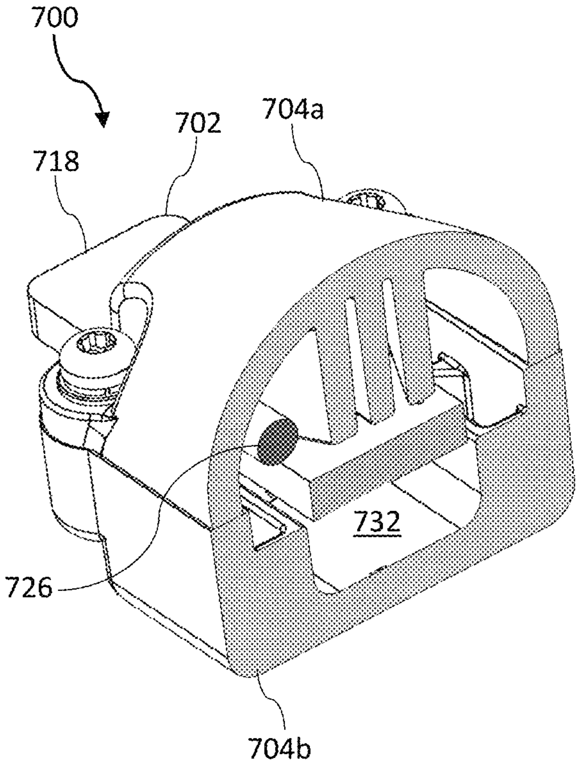
FIG. 7E shows a cross section view simplified illustration of a portion of a pyrotechnic fuse.

Reference is made to FIG. 7A, which shows a perspective view simplified illustration of a pyrotechnic fuse, and to FIG. 7B, which shows a perspective view simplified illustration of a portion of a pyrotechnic fuse, and to FIG. 7C, which shows a cross section view simplified illustration of a portion of a pyrotechnic fuse, and to FIG. 7D, which shows a cross section view simplified illustration of a portion of a pyrotechnic fuse, and to FIG. 7E, which shows a cross section view simplified illustration of a portion of a pyrotechnic fuse.

The system 700 may be configured to integrate with one or more inverters of a photovoltaic system. The system 700 may be representative of the apparatus 100. The system 700 may include a portion, or one or more elements, of the apparatus 100. The system 700 may include a busbar 702 (which may be the busbar 102). At least a portion of the busbar 702 may be encased within a housing 704. The housing 704 may be configured to house (or enclose) any one or more of the busbar 702, a magnetic switch 706 (which may be the magnetic switch 106), a pyrotechnic actuator 712 (which may be the pyrotechnic actuator 112), or a second fuse 726 (which may be the second fuse 126).

The housing 704 may include a top portion 704*a* of the housing 704 and a bottom portion 704*b* of the housing 704. The top portion 704*a* and the bottom portion 704*b* of the housing 704 may be configured to connect. The housing 704 may have a recess 732 therein. The recess 732 may be sized to fit therein at least a portion of the busbar 702, the magnetic switch 706, the pyrotechnic actuator 712, and the second fuse 726. The recess 732 may be sized to enable the pyrotechnic actuator 712 to extend therein, thereby breaking the busbar 702. The recess 732 may be sized to enable the busbar 702 to break therein. The recess 732 may be sized such that when the busbar 702 breaks, the housing encloses and isolates the broken busbar 702 therein.

The housing 704 may enclose the magnetic concentrator and the aperture thereof. The housing 704 may enclose the pyrotechnic actuator 712. The housing 704 may include an opening 734, such as a chimney, configured to fit the pyrotechnic actuator 712. The opening 734 may enable replacement of the pyrotechnic actuator 712 without opening of the housing 704.

The housing 704 may encase at least a portion of the busbar 702. The encased portion of the busbar 702 (or in other words, the portion of the busbar 702 that is encased within the housing 704) may extend between a first opening 722*a* (which may be the opening 122*a*) and a second opening 722*b* (which may be the opening 122*b*). The encased portion of the busbar 702 may extend between a first end 718 (which may be the first end 118) and a second end 720 (which may be the second end 120). At least one of a first divot 724*a* (which may be the first divot 124*a*) and a second divot 724*b* (which may be the second divot 124*b*) may be disposed within the housing 704. Both of the first divot 724*a* and the second divot 724*b* may be disposed within the housing 704. At least one of the first divot 724*a* and the second divot 724*b* may be disposed within the recess 732. Both of the first divot 724*a* and the second divot 724*b* may be disposed within the recess 732.

Figure 8A:
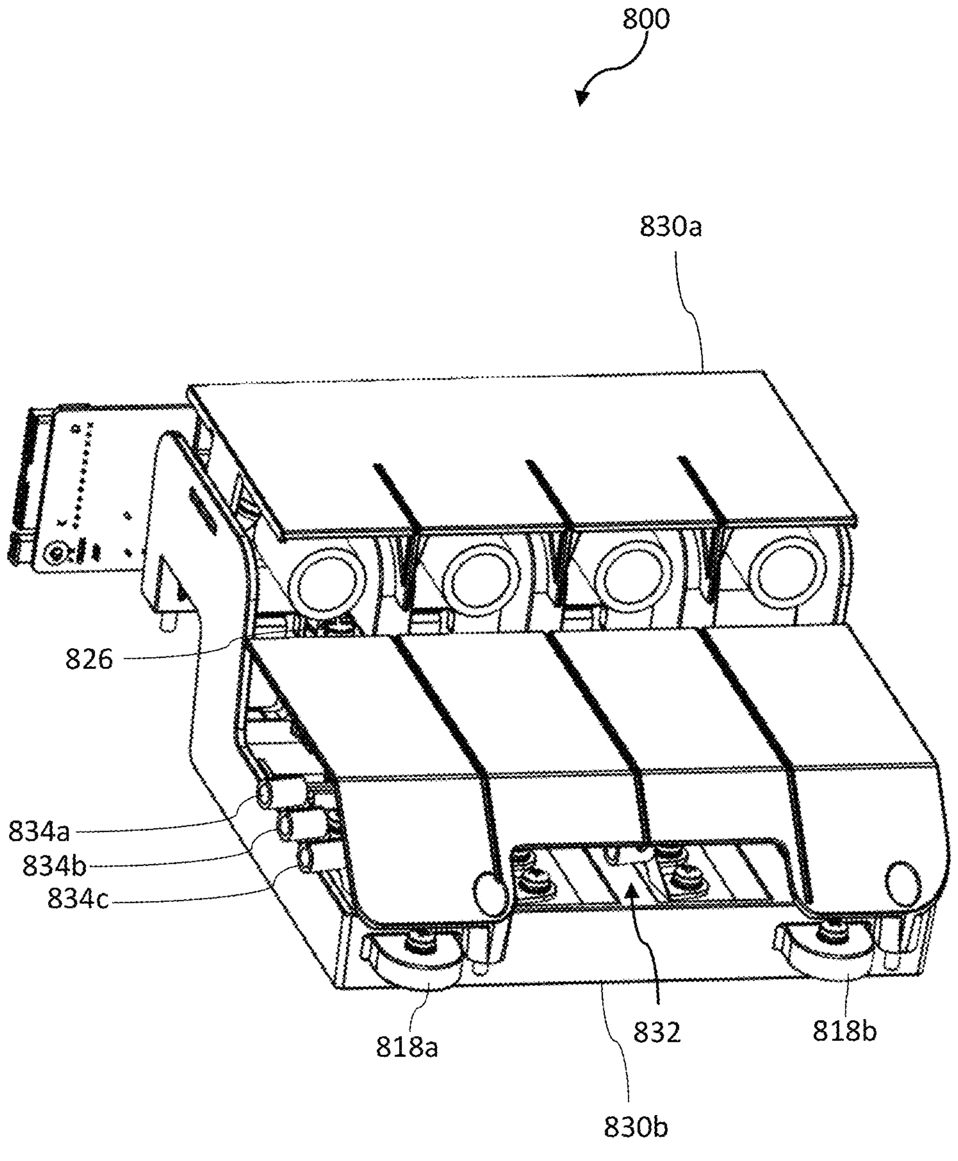
FIG. 8A shows a perspective view simplified illustration of a pyrotechnic fuse.
Figure 8B:
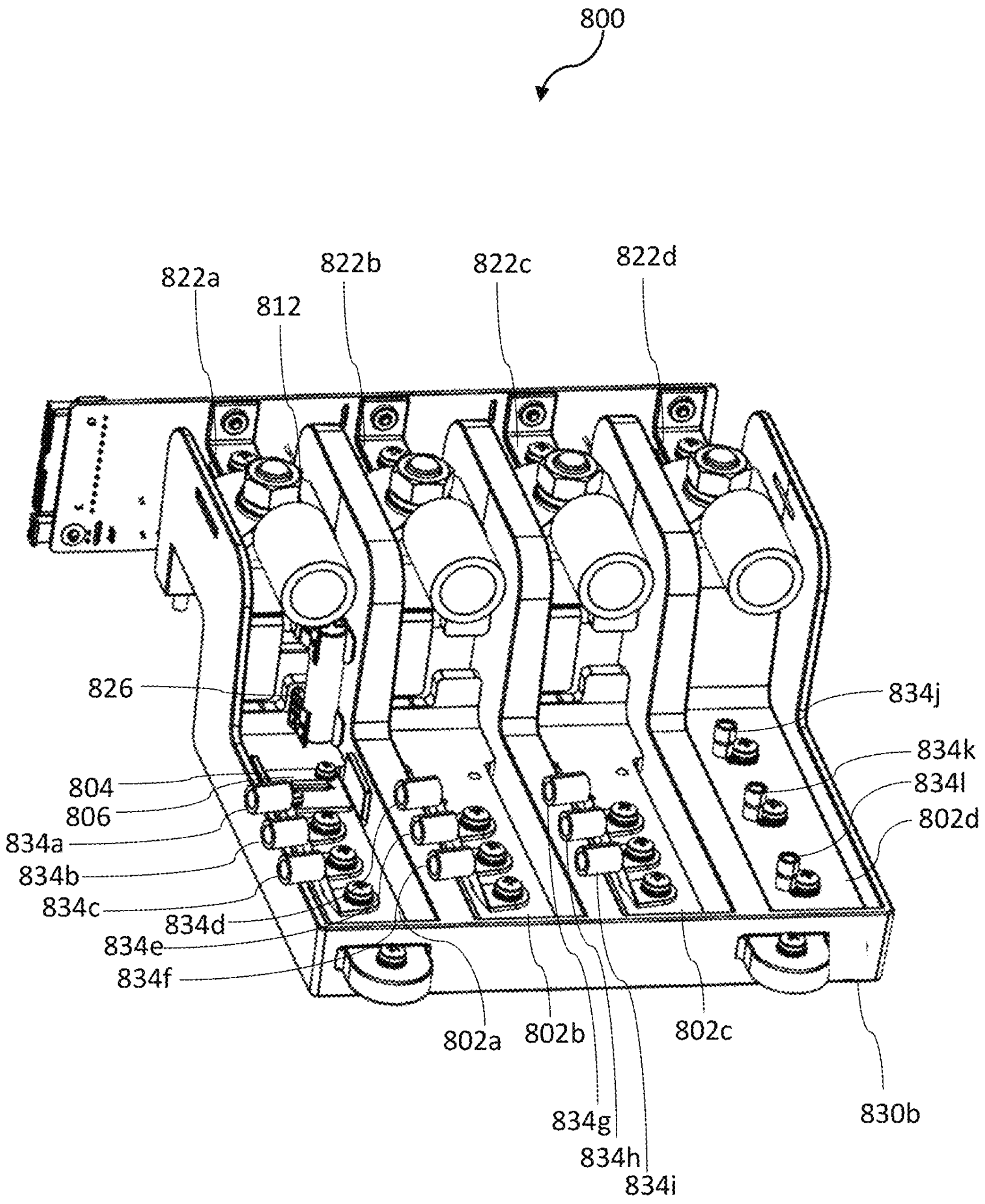
FIG. 8B shows a perspective view simplified illustration of a portion of a pyrotechnic fuse.
Figure 8C:
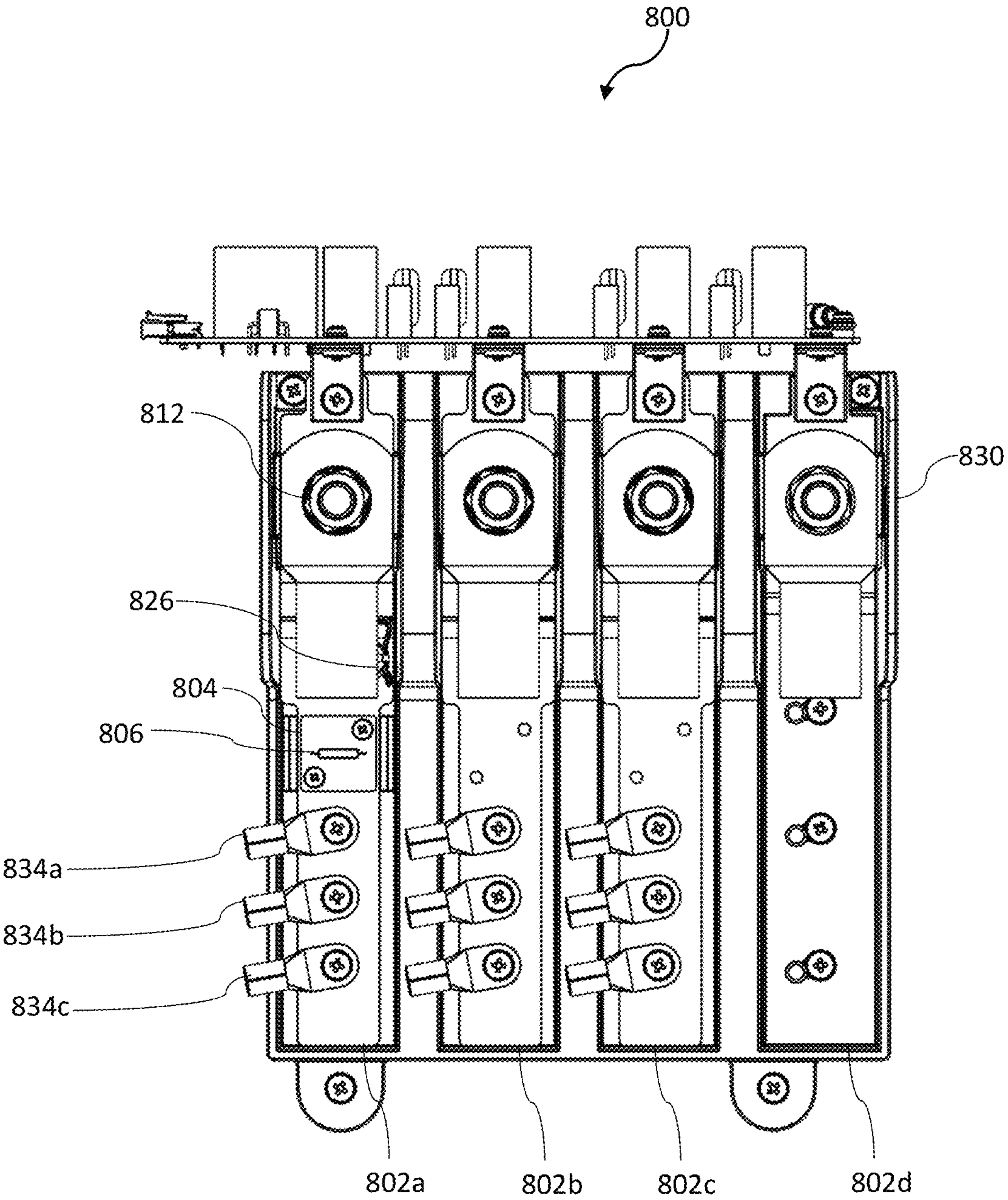
FIG. 8C shows a top view simplified illustration of a portion of a pyrotechnic fuse.
Figure 8D:
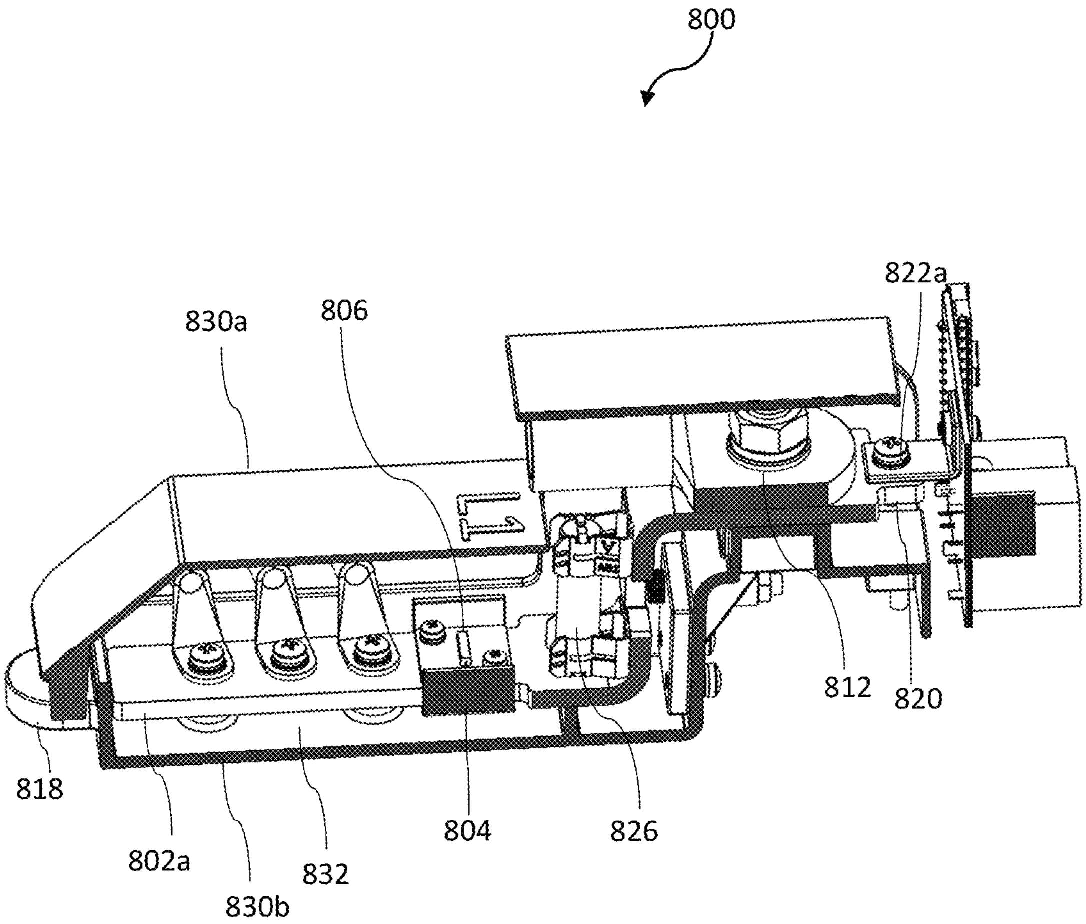
FIG. 8D shows a perspective cross section view simplified illustration of a pyrotechnic fuse.

Reference is made to FIG. 8A, which shows a perspective view simplified illustration of a pyrotechnic fuse, and to FIG. 8B, which shows a perspective view simplified illustration of a portion of a pyrotechnic fuse, and to FIG. 8C, which shows a top view simplified illustration of a portion of a pyrotechnic fuse, and to FIG. 8D, which shows a perspective cross section view simplified illustration of a pyrotechnic fuse.

The system 800 (which may be the system 700 or 600) may include a plurality of busbars 802*a*, 802*b*, 803*c*, 802*d* (collectively referred to herein as plurality of busbars 802). The plurality of busbars 802 may be enclosed in a housing 830. The housing 830 may include a top portion 830*a* of the housing 830 and a bottom portion 830*b* of the housing 830. The top portion 830*a* and the bottom portion 830*b* of the housing 830 may be configured to connect. The housing may be configured to support any one or more of the plurality of busbars 802, the magnetic switch 806, a pyrotechnic actuator 812, and/or a second fuse 826. The housing 830 may have one or more connectors 818*a* or 818*b* configured to secure or anchor the position of the housing 830. The connectors 818*a* or 818*b* may be configured to electrically connect to one or more of the plurality of busbars 802.

The housing 830 may have a recess 832 therein. The recess 832 may be sized to fit therein at least a portion of the plurality of the busbars 802, the magnetic switch 806, the pyrotechnic actuator 812, and/or the second fuse 826. The recess 832 may be sized to enable the pyrotechnic actuator 812 to extend therein, which may break at least one of the plurality of busbars 802. The recess 832 may be sized to enable at least one of the plurality of busbars 802 to break therein.

The one or more busbars 802 may include one or more terminals 834*a*, 834*b*, 834*c*, 834*d*, 834*e*, 834*f*, 834*g*, 834*h*, 834*i*, 834*j*, 834*k*, or 834*l* (collectively referred to herein as one or more terminals 834). For example, each busbar 802 may have at least one terminal 834. For example, each busbar 802 may have three terminals. The one or more terminals 834 may electrically connect the plurality of busbars 802 to one or more conductive elements, which one or more terminals 834. The plurality of busbars 802 may transfer current to the one or more terminals 834. The one or more terminals 834 may be located at either end of each busbar 802. The one or more terminals 834 may be located at least on one end of the plurality of busbars 802.

The one or more busbars 802 may include one or more connectors 822*a*, 822*b*, 822*c*, or 822*d* (collectively referred to herein as connectors 822). The one or more connectors 822 may be configured to connect the one or more busbars 802 to one or more conductive elements, which may form the one or more first circuits. Each busbar of the plurality of busbars 802 may form a first circuit. At least one busbar of the plurality of busbars 802 may form a first circuit. Each first circuit in the system 800 may have a corresponding second circuit, the second circuit comprising at least one magnetic switch 806 and pyrotechnic actuator 812.

The system 800 may include at least one magnetic concentrator 804 partially surrounding at least one busbar of the plurality of busbars 802. The magnetic concentrator 804 may be configured to concentrate a magnetic flux generated by the current flow in at least one of the plurality of busbars 802. The magnetic concentrator 804 may be the same or similar to the magnetic concentrator 104 or 604 of systems 100 or 600, respectively. The magnetic concentrator 104 may be configured to intensify the magnetic flux generated by the current flow in at least one of the plurality of busbars 802. The magnetic concentrator 804 may be configured to direct the magnetic flux generated by the current flow in at least one of the plurality of busbars 802.

The magnetic concentrator 804 may be configured to direct the magnetic flux generated by the current flow in at least one of the plurality of busbars 802 to the magnetic switch 806. The magnetic concentrator 804 may be configured to direct and/or concentrate the magnetic flux generated by the current flow in at least two of the plurality of busbars 802. The magnetic concentrator 804 may be configured to direct and/or concentrate the magnetic flux generated by the current flow in at least two of the plurality of busbars 802 to the magnetic switch 806.

The system 800 may include at least one magnetic switch 806 corresponding to the at least one magnetic concentrator. The at least one magnetic switch 806 may be similar to the magnetic switch 106 of the apparatus 100. For example, the system 800 may include at least one magnetic switch 806 for each magnetic concentrator 804. For example, each one of the plurality of busbars 802 may have a corresponding magnetic switch 806 and magnetic concentrator 804. For example, each two busbars of the plurality of busbars 802 may have one magnetic switch 806 and one magnetic concentrator 804. For example, each two busbars of the plurality of busbars 802 may have two magnetic switches 806 and two magnetic concentrators 804.

Each of the magnetic switches 806 may be rotatable about an axis of rotation. Each of the magnetic switches 806 may be rotatable in relation to an aperture of the magnetic concentrator 804 corresponding to the magnetic switch 806. The magnetic switch 806 may be rotatable in relation to the magnetic concentrator 804. The current flowing in each magnetic switch 806, and therefore in each second circuit, may be determined by an angle of the magnetic switch 806.

The system 800 may have a plurality of busbars 802 corresponding to a plurality of magnetic switches 806. The plurality of magnetic switches can be individually set, such that each busbar of the plurality of busbars 802 can have a separate (or individual) threshold current. Each magnetic switch may be connected to at least one pyrotechnic actuator 812. Each pyrotechnic actuator 812 may be configured to break a busbar 802 to which it corresponds, such as when the current in the busbar 802 reaches the threshold level as set by the angle of the magnetic switch 806 corresponding to that individual busbar 802.

The system 800 may include at least one pyrotechnic actuator 812. The pyrotechnic actuator 812 may be configured to break one or more of the plurality of busbars 802. The system 800 may include at least one pyrotechnic actuator 812 corresponding to each busbar of the plurality of busbars 802. The system 800 may include at least one pyrotechnic actuator 812 corresponding to each magnetic switch 806. The system 800 may include at least one pyrotechnic actuator 812 corresponding to each magnetic concentrator 804. Each magnetic switch 806 may be coupled to at least one pyrotechnic actuator 812 such that the activation of the pyrotechnic actuator 812 is based on a threshold current set by the magnetic switch 806.

The threshold current may be a current value for the current flow in the corresponding busbar 802. When the current in the busbar 802 is reached, the magnetic switch 806 corresponding to the busbar 802 may send a current signal to the pyrotechnic actuator 812, thereby activating the pyrotechnic piston 812. The current in the magnetic switch 806 may be configured to automatically activate the pyrotechnic actuator 812 when the current of the corresponding busbar 802 is equal to or greater than the threshold current determined by the angle of the magnetic switch 806.

The system 800 may include the second fuse 826. The second fuse 826 may be configured to disrupt residual current and/or arcing in a broken busbar 802. The second fuse 826 may be configured to disrupt current flow in the broken busbar 802. The second fuse 826 may be a current limiting fuse. The second fuse 826 may be a sand fuse.

Figure 9A:
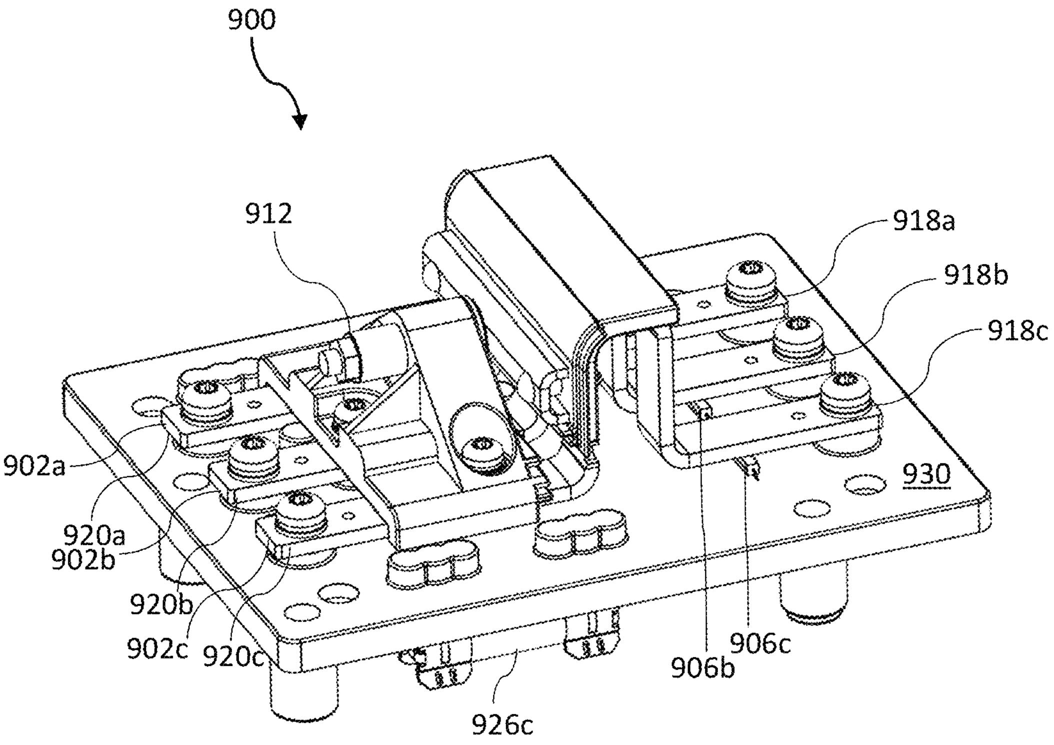
FIG. 9A shows a perspective view simplified illustration of a pyrotechnic fuse.
Figure 9B:
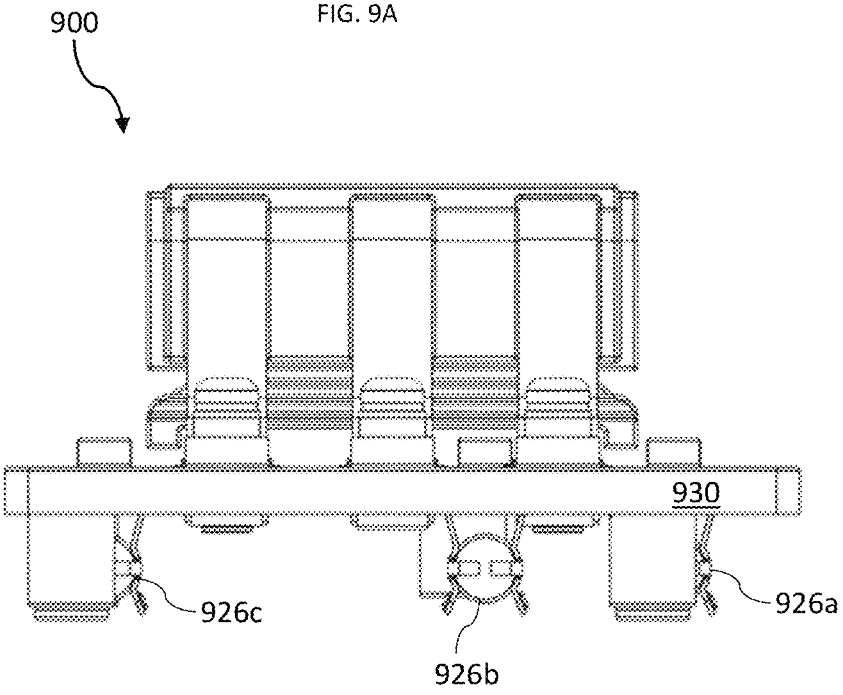
FIG. 9B shows a side view simplified illustration of a pyrotechnic fuse.
Figure 9C:
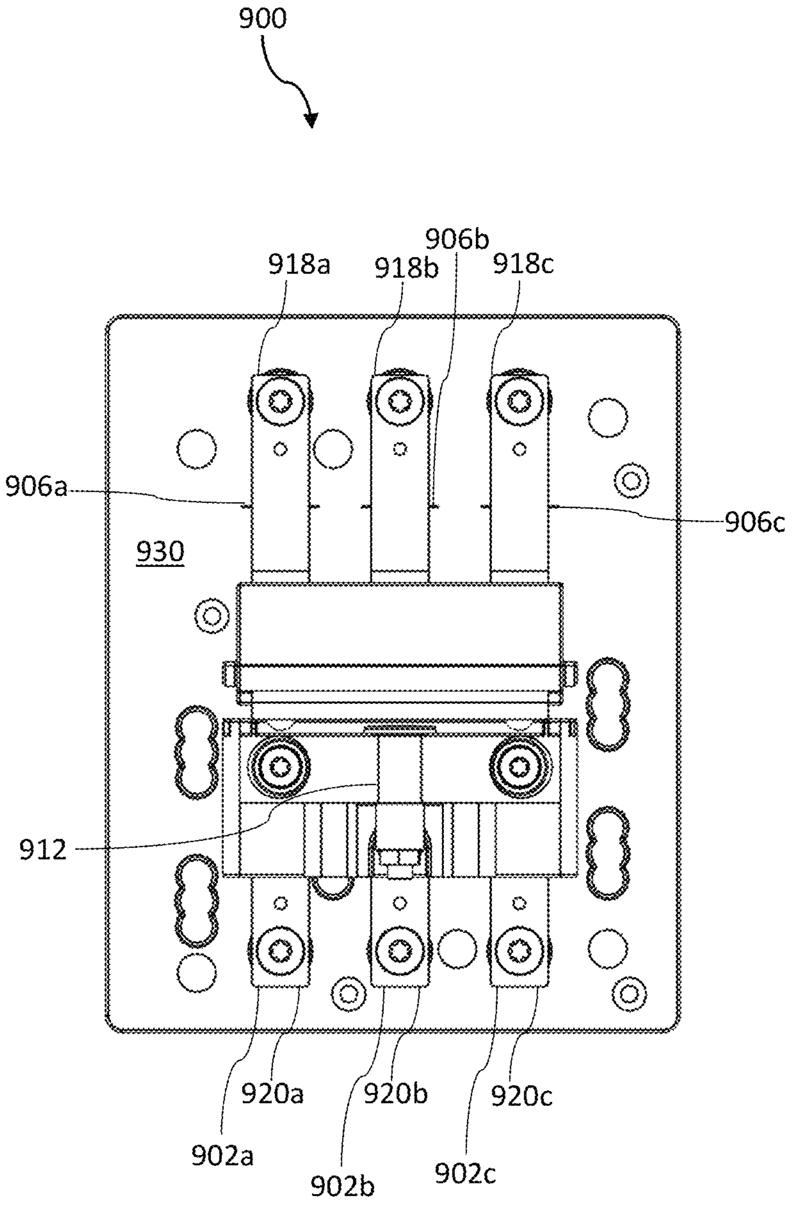
FIG. 9C shows a top view simplified illustration of a pyrotechnic fuse.
Figure 9D:
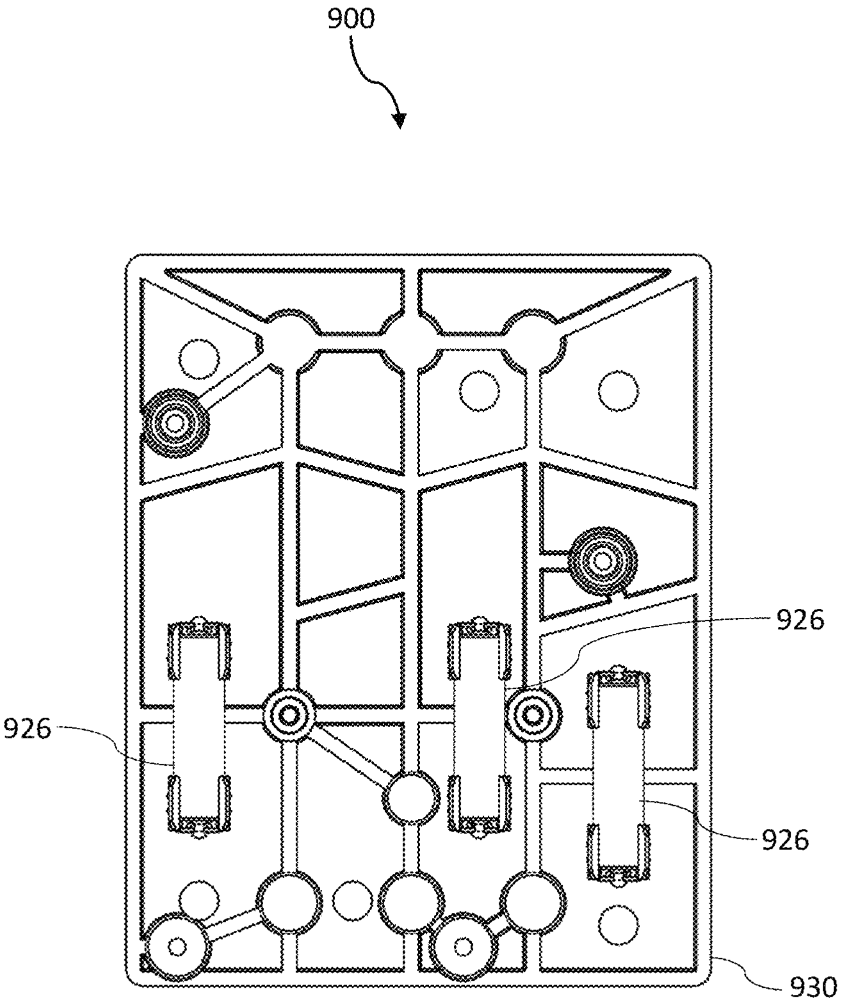
FIG. 9D shows a bottom view simplified illustration of a pyrotechnic fuse.

Reference is made to FIG. 9A, which shows a perspective view simplified illustration of a pyrotechnic fuse, and to FIG. 9B, which shows a side view simplified illustration of a pyrotechnic fuse, and to FIG. 9C, which shows a top view simplified illustration of a pyrotechnic fuse, and to FIG. 9D, which shows a bottom view simplified illustration of a pyrotechnic fuse.

The system 900 (which may be a system 800, 700, or 600) may include three busbars 902*a*, 902*b*, or 903*c* (collectively referred to herein as three busbars 902). The three busbars 902 may be configured to transfer three phase electric power. Each busbar of the three busbars 902 may have a first end 918 and a second end 920. The first end 918 and the second end 920 of each busbar may be configured to connect to one or more conductive elements, thereby having each busbar 902 form a first circuit. Thus, the system 900 may have three first circuits (similar to the first circuit 608 of FIG. 6).

The system 900 may include a housing 930. The housing 930 may include a base or plate configured to support one or more of the three busbars 902, three magnetic switches 906, at least one pyrotechnic actuator 912, and/or three second fuses 926 (926*a*, 926*b*, and 926*c*, which may correspond to the second fuse 126). The three of busbars 902 may be enclosed in or supported by the housing 930. The housing 930 may be configured to couple to (or secure the position of) any one or more of the three busbars 902, three magnetic switches 906, three pyrotechnic actuators 912, and/or three second fuses 926.

The system 900 may include three magnetic switches 906*a*, 906*b*, or 906*c* (collectively referred to herein as three magnetic switches 906). The three magnetic switches 906 may each correspond to one of the three busbars 902, thus, each busbar 902 may have a corresponding magnetic switch 906. The magnetic switches 906 may be set individually, such that the threshold current for each busbar 902 may be independent of the threshold currents of the other two busbars 902. The magnetic switches 906 may each receive a directed or concentrated magnetic flux from one or more magnetic concentrators. The one or more magnetic concentrators may each correspond to a busbar 902 and a magnetic switch 906, such that each busbar 902 has an individual magnetic switch 906 and an individual magnetic concentrator 904. Thus, each busbar 902 can be set to have a separate threshold current.

The system 900 may include at least one pyrotechnic actuator 912. The number of pyrotechnic actuators 912 may correspond to the number of second circuits in the system 900.

For a system 900 having one pyrotechnic actuator 912, the pyrotechnic actuator 912 forms a single second circuit. The pyrotechnic actuator 912 may be configured to break all three busbars 902. Thus, if the current in one of the busbars 902 reaches the threshold current as set by the corresponding magnetic switch 906 of that busbar 902, the pyrotechnic actuator 912 may break all three busbars 902. The pyrotechnic actuator 912 may be configured to break all three busbars 902 at the same time (or essentially the same time). For a system 900 having two pyrotechnic actuators 912, the pyrotechnic actuators 912 may form two second circuits. One of the pyrotechnic actuators 912 may be configured to break at least two of the busbars 902, and a second pyrotechnic actuator 912 may be configured to break a third busbar 902.

Figure 10:
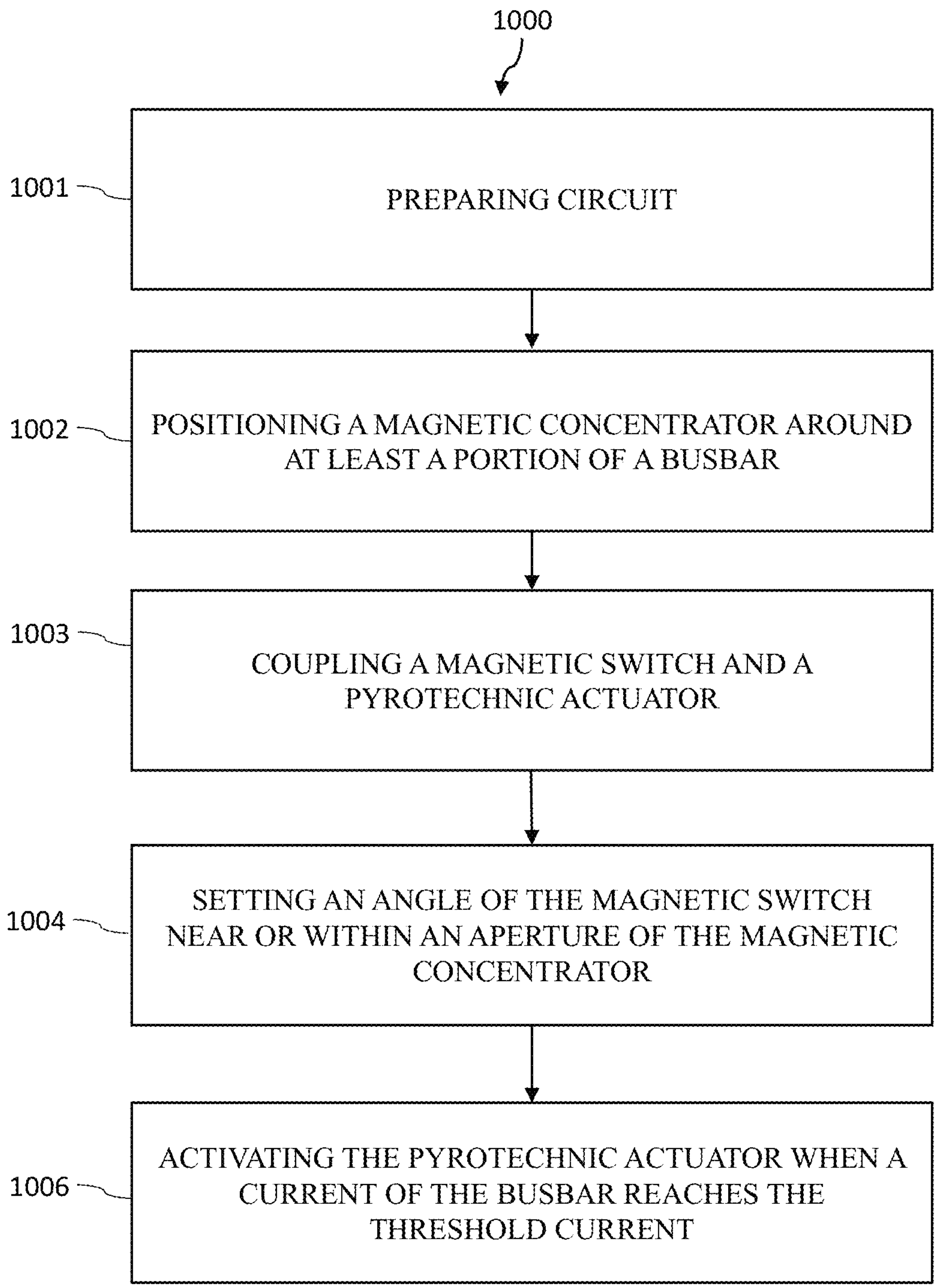
FIG. 10 shows a flow chart for a method for activating a pyrotechnic fuse.

Reference is made to FIG. 10, which shows a flow chart for a method 1000 for activating a pyrotechnic fuse. The method 1000 for activating the pyrotechnic fuse may be implemented using any one or more of the apparatus 100, the system 600, the system 700, the system 800, and/or the system 900.

The method 1000 may include, at step 1002, positioning a magnetic concentrator (such as the concentrator 104 or 804) around at least a portion of a busbar (such as the busbar 102, 702, 802, or 902). The method 1000 may include, at step 1004, setting an angle of the magnetic switch near or within an aperture of the magnetic concentrator. The method 1000 may include, at step 1006, activating a pyrotechnic actuator (such as actuator 112, 612, 712, 812, or 912) when a current of the busbar reaches a threshold current.

The method 1000 may include, at step 1001, preparing an apparatus or system comprising a pyrotechnical fuse. Step 1001 may include setting up the apparatus 100. Step 1001 may include setting up the system 600, 700, 800, or 900. Step 1001 may include providing a busbar and/or a power line (such as the power line 602). Step 1001 may include providing a plurality of busbars and/or power lines. Step 1001 may include connecting the busbar and/or the power line to one or more conductive elements at the first end and/or the second end of the busbar and/or the power line. Step 1001 may include electrically connecting the busbar and/or the power line into a first circuit. Step 1001 may include electrically connecting the plurality of busbars and/or the plurality of power lines into a plurality of first circuits. Each first circuit may include one busbar and/or one power line.

Step 1001 may include electrically connecting at least one second circuit. Step 1001 may include electrically connecting at least one second circuit per one first circuit. Step 1001 may include electrically connecting one second circuit for two or three first circuits. Step 1001 may include electrically connecting one second circuit for a plurality of first circuits. The second circuit may include any one or more of: at least one magnetic concentrator, at least one magnetic switch (such as the magnetic switch 106, 606, 706, 806, or 906), or at least one pyrotechnic actuator.

The method 1000 may include, at step 1002, positioning the magnetic concentrator around at least a portion of a busbar. Step 1002 may include positioning the magnetic concentrator at a location in which the magnetic flux generated by a current flowing through the busbar reaches at least a portion of the magnetic concentrator. Step 1002 may include fixing a position of the magnetic concentrator such that the magnetic concentrator is at least partially surrounding the busbar.

A position that may be at least partially surrounding may include a position in which the one or more walls of the magnetic concentrator may be following at least a portion of a surface of the busbar (for example, such as may be depicted in FIG. 1, FIG. 2, FIG. 3A, FIG. 3B, FIG. 4, FIG. 5A, FIG. 5B, or FIG. 6). At step 1003, the system may couple the magnetic switch and the pyrotechnic actuator. The method 1000 may include coupling a power supply between the magnetic switch and the pyrotechnic actuator.

The method 1000 may include, at step 1004, setting an angle of the magnetic switch near or within the aperture of the magnetic concentrator. Step 1004 may include determining a threshold current by setting the angle of the magnetic switch near or within the aperture of the magnetic concentrator 104 or 804. Step 1004 may include setting the angle of the magnetic switch by rotating the magnetic switch. Step 1004 may include rotating the magnetic switch at a yaw rotation in relation to the busbar.

Step 1004 may include rotating the magnetic switch at a yaw rotation in relation to the magnetic concentrator. The method 1000 may include rotating the magnetic switch at a pitch rotation in relation to the busbar. The method 1000 may include rotating the magnetic switch at a pitch rotation in relation to the magnetic concentrator. The method 1000 may include setting the angle of the magnetic switch by rotating the magnetic switch to a current level using the one or more markings.

The method 1000 may include, at step 1006, activating the pyrotechnic actuator. Step 1006 may include activating the pyrotechnic actuator when a current of the busbar reaches the threshold current. Step 1006 may include automatically activating the pyrotechnic actuator when a current of the busbar reaches a threshold current set by the angle of the magnetic switch. Step 1006 may include stopping electrical flow in the busbar by activation of the pyrotechnic actuator. Step 1006 may include switching fusing to a second fuse (such as second fuse 126, 626, 726, 826, or 926) once the busbar is broken. Step 1006 may include stopping electrical flow in the busbar by activating the second fuse once the busbar is broken by the pyrotechnic actuator.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

Following are clauses that describe the invention:

Clause 1. An apparatus comprising:

- a magnetic concentrator configured to partially surround at least a portion of a busbar, wherein the magnetic concentrator comprises an aperture;

a pyrotechnic actuator, coupled to the busbar, configured to stop electrical flow in the busbar when the pyrotechnic actuator is activated; and a magnetic switch, located within the aperture, wherein the magnetic switch is configured to activate the pyrotechnic actuator when a current through the busbar reaches a threshold current, and wherein an angle of the magnetic switch relative to the aperture determines the threshold current.

Clause 2. The apparatus of clause 1, wherein the magnetic switch is rotatable in relation to the aperture about an axis of rotation.

Clause 3. The apparatus of any one of clauses 1-2, wherein the magnetic concentrator comprises a yoke.

Clause 4. The apparatus of any one of clauses 1-3, wherein the magnetic concentrator is composed of a ferromagnetic material.

Clause 5. The apparatus of any one of clauses 1-4, wherein the magnetic concentrator comprises a U-shape.

Clause 6. The apparatus of any one of clauses 1-5, wherein the magnetic concentrator comprises a chamfer around one or more edges of the magnetic concentrator.

Clause 7. The apparatus of any one of clauses 1-6, wherein the magnetic concentrator comprises an inner surface, and wherein the smallest distance between a point on the inner surface and the busbar is substantially equal for all points along the inner surface.

Clause 8. The apparatus of any one of clauses 1-7, wherein the magnetic concentrator comprises an inner wall, and wherein the inner wall is parallel to at least two outer walls of the busbar.

Clause 9. The apparatus of any one of clauses 1-8, further comprising a current sensor, wherein the current sensor comprises the magnetic concentrator and the magnetic switch.

Clause 10. The apparatus of any one of clauses 1-9, wherein the magnetic switch comprises one or more markings associated with one or more values of the threshold current.

Clause 11. The apparatus of any one of clauses 1-10, wherein the magnetic switch is within a first proximity of a middle of the busbar.

Clause 12. The apparatus of any one of clauses 1-11, wherein the first proximity comprises a distance of less than 15 mm.

Clause 13. The apparatus of any one of clauses 1-12, wherein the magnetic concentrator is within a second proximity of a middle of the busbar.

Clause 14. The apparatus of any one of clauses 1-13, wherein the magnetic switch forms a circuit, the circuit comprising a pyrotechnic fuse, and wherein a current in the circuit is determined by the angle of the magnetic switch in relation to the magnetic concentrator.

Clause 15. The apparatus of any one of clauses 1-14, wherein the threshold current is at least one order of magnitude smaller than the current of the busbar.

Clause 16. The apparatus of any one of clauses 1-15, wherein the pyrotechnic actuator is configured to mechanically disconnect the busbar.

Clause 17. The apparatus of any one of clauses 1-16, wherein the magnetic switch comprises a reed switch.

Clause 18. The apparatus of any one of clauses 1-17, wherein the magnetic switch comprises a hall effect switch.

Clause 19. The apparatus of any one of clauses 14-18, wherein the current of the circuit of the magnetic switch is configured to automatically activate the pyrotechnic actuator when the current of the busbar is equal to or greater than the threshold current.

Clause 20. The apparatus of any one of clauses 1-19, wherein the busbar comprises a single unit of conducting material.

Clause 21. An apparatus comprising:

a magnetic concentrator configured to partially surround at least a portion of a busbar, wherein the magnetic concentrator comprises an aperture;

a pyrotechnic actuator, coupled to the busbar, configured to stop electrical flow in the busbar when the pyrotechnic actuator is activated; and a magnetic switch, located within the aperture, wherein the magnetic switch is configured to activate the pyrotechnic actuator when a current through the busbar reaches a threshold current, and wherein an angle of the magnetic switch relative to the aperture determines the threshold current.

Clause 22. An apparatus comprising:

a first circuit having a high current value, wherein the first circuit comprises a busbar; and a second circuit having a low current value, wherein the low current value is at least one order of magnitude lower than the high current value, and wherein the second circuit comprises:

a magnetic concentrator configured to partially surround at least a portion of the first circuit, wherein the magnetic concentrator comprises an aperture;

a pyrotechnic actuator coupled to the second circuit and configured to substantially reduce electrical flow in the first circuit when the pyrotechnic actuator is activated; and a magnetic switch located near the aperture, wherein the magnetic switch is configured to activate the pyrotechnic actuator when a current in the first circuit reaches a threshold current, and wherein the threshold current is based on an angle of the magnetic switch relative to the aperture.

Clause 23. A method comprising:

positioning a magnetic concentrator around at least a portion of a busbar, wherein the magnetic concentrator comprises an aperture and a magnetic switch;

determining a threshold current based on setting an angle of the magnetic switch near or within the aperture, wherein the magnetic switch forms a circuit with a pyrotechnic actuator; and activating the pyrotechnic actuator when a current of the busbar reaches the threshold current, such that electrical flow in the busbar is substantially stopped.

Clause 24. A system comprising:

a busbar;

a magnetic concentrator configured to partially surround at least a portion of the busbar, wherein the magnetic concentrator comprises an aperture;

a pyrotechnic actuator coupled to the busbar, wherein the pyrotechnic actuator is configured to stop electrical flow in the busbar when the pyrotechnic actuator is activated; and a magnetic switch located near or within the aperture, wherein the magnetic switch is configured to activate the pyrotechnic actuator when a current in the busbar reaches a threshold current, and wherein an angle of the magnetic concentrator relative to the aperture determines the threshold current.

The invention claimed is:

1. An apparatus comprising:

a magnetic concentrator configured to partially surround at least a portion of a busbar, wherein the magnetic concentrator comprises an aperture;

a pyrotechnic actuator, coupled to the busbar and configured to stop electrical flow in the busbar when the pyrotechnic actuator is activated; and a magnetic switch, located within the aperture, wherein the magnetic switch is configured to activate the pyrotechnic actuator when a current through the busbar reaches a threshold current, and wherein an angle of the magnetic switch relative to the aperture determines the threshold current, wherein the magnetic switch is rotatable about an axis of the aperture.

2. The apparatus of claim 1, wherein the magnetic concentrator comprises a yoke.

3. The apparatus of claim 1, wherein the magnetic concentrator is composed of a ferromagnetic material.

4. The apparatus of claim 1, wherein the magnetic concentrator comprises a chamfer around one or more edges of the magnetic concentrator.

5. The apparatus of claim 1, wherein the magnetic concentrator comprises an inner surface, and wherein distance between the inner surface and the busbar is substantially equal for all points along the inner surface.

6. The apparatus of claim 1, wherein the magnetic concentrator comprises an inner wall, and wherein the inner wall is parallel to at least two outer walls of the busbar.

7. The apparatus of claim 1, wherein the magnetic switch comprises a current sensor.

8. The apparatus of claim 1, wherein the magnetic switch comprises one or more markings associated with one or more values of the threshold current.

9. The apparatus of claim 1, wherein the magnetic switch forms a circuit, wherein the circuit comprises a pyrotechnic fuse, and wherein a current in the circuit is determined by the angle of the magnetic switch in relation to the magnetic concentrator.

10. The apparatus of claim 9, wherein the current of the circuit of the magnetic switch is configured to automatically activate the pyrotechnic actuator when the current of the busbar is equal to or greater than the threshold current.

11. The apparatus of claim 1, wherein the pyrotechnic actuator is configured to mechanically disconnect the busbar.

12. A method comprising:

positioning a magnetic concentrator around at least a portion of a busbar, wherein the magnetic concentrator comprises an aperture and a magnetic switch, wherein the magnetic switch is rotatable about an axis of the aperture;

setting an angle of the magnetic switch near or within the aperture, wherein the magnetic switch forms a circuit with a pyrotechnic actuator, wherein the angle determines a threshold current; and activating the pyrotechnic actuator when a current of the busbar reaches the threshold current, such that electrical flow in the busbar is substantially stopped.

13. A system comprising:

a busbar;

a magnetic concentrator configured to partially surround at least a portion of the busbar, wherein the magnetic concentrator comprises an aperture;

a pyrotechnic actuator coupled to the busbar, wherein the pyrotechnic actuator is configured to stop electrical flow in the busbar when the pyrotechnic actuator is activated; and a magnetic switch located near or within the aperture, wherein the magnetic switch is configured to activate the pyrotechnic actuator when a current in the busbar reaches a threshold current, wherein an angle of the magnetic switch relative to the aperture determines the threshold current, wherein the magnetic switch is rotatable about an axis of the aperture.

14. The system of claim 13, wherein the magnetic concentrator comprises a yoke.

15. The system of claim 13, wherein the magnetic concentrator is composed of a ferromagnetic material.

16. The system of claim 13, wherein the magnetic switch comprises a current sensor.

17. The system of claim 13, wherein the magnetic switch comprises one or more markings associated with one or more values of the threshold current.

18. The system of claim 13, wherein the magnetic switch forms a circuit, wherein the circuit comprises a pyrotechnic fuse, and wherein a current in the circuit is determined by the angle of the magnetic switch in relation to the magnetic concentrator.

19. The system of claim 13, wherein the pyrotechnic actuator is configured to mechanically disconnect the busbar.

20. The method of claim 12, further comprising concentrating a magnetic field produced by the current in the busbar using a yoke.

21. The method of claim 12, further comprising sensing the current in the busbar using a current sensor.

* * * * *